US009264371B2

(12) United States Patent
Yamaguchi et al.

(10) Patent No.: US 9,264,371 B2
(45) Date of Patent: Feb. 16, 2016

(54) ROUTER, METHOD FOR CONTROLLING THE ROUTER, AND COMPUTER PROGRAM

(71) Applicant: Panasonic Corporation, Osaka (JP)

(72) Inventors: Takao Yamaguchi, Osaka (JP); Atsushi Yoshida, Osaka (JP); Tomoki Ishii, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 421 days.

(21) Appl. No.: 13/937,246

(22) Filed: Jul. 9, 2013

(65) Prior Publication Data

US 2013/0294458 A1 Nov. 7, 2013

Related U.S. Application Data

(63) Continuation of application No. PCT/JP2012/006397, filed on Oct. 4, 2012.

(30) Foreign Application Priority Data

Oct. 14, 2011 (JP) ................................. 2011-226938

(51) Int. Cl.
*H04L 12/833* (2013.01)
*H04L 12/835* (2013.01)
*G06F 15/78* (2006.01)
*G06F 13/16* (2006.01)
*G06F 13/40* (2006.01)

(52) U.S. Cl.
CPC ............ *H04L 47/30* (2013.01); *G06F 13/1657* (2013.01); *G06F 13/4022* (2013.01); *G06F 15/7825* (2013.01)

(58) Field of Classification Search
None
See application file for complete search history.

(56) References Cited

U.S. PATENT DOCUMENTS

| 5,959,995 A | 9/1999 | Wicki et al. |
| 6,359,895 B1 | 3/2002 | Yamanaka |
| 2005/0203988 A1* | 9/2005 | Nollet ................. G06F 15/7825 709/201 |

(Continued)

FOREIGN PATENT DOCUMENTS

| JP | 2000-286893 A | 10/2000 |
| JP | 3816531 B | 6/2006 |

(Continued)

OTHER PUBLICATIONS

Michihiro Koibuchi et. al, "A Simple Fault-tolerant Mechanism for Networks-on-Chips", Dec. 12, 2007, IEICE Technical Report, vol. 107, No. 398., pp. 9-14 and English Abstract.

(Continued)

*Primary Examiner* — Chirag Shah
*Assistant Examiner* — Amar Persaud
(74) *Attorney, Agent, or Firm* — Renner, Otto, Boisselle & Sklar, LLP

(57) ABSTRACT

An exemplary router is provided for an integrated circuit that has distributed buses and is arranged on a transmission route that leads from a transmission node to a reception node on the distributed buses to relay data. The distributed buses include first and second routes, each leading from the router to the reception node. The router includes a notifying section which sends a data transfer permission request to a second router on the first route and a third router on the second route and which determines whether or not the request is approved before a predetermined standby period passes to see if there is any abnormality in the first and second routes.

19 Claims, 18 Drawing Sheets

(56) References Cited

U.S. PATENT DOCUMENTS

| | | | |
|---|---|---|---|
| 2007/0274331 A1* | 11/2007 | Locatelli | H04L 47/2416 370/402 |
| 2008/0084893 A1 | 4/2008 | Lee | |
| 2011/0026405 A1* | 2/2011 | Takagi | H04L 45/00 370/235 |
| 2011/0069612 A1 | 3/2011 | Yamaguchi et al. | |
| 2011/0261706 A1 | 10/2011 | Fujiwara et al. | |
| 2012/0057467 A1 | 3/2012 | Yoshida et al. | |
| 2013/0028083 A1* | 1/2013 | Yoshida | H04L 49/60 370/230 |
| 2013/0142066 A1* | 6/2013 | Yamaguchi | H04L 49/109 370/252 |
| 2014/0156929 A1* | 6/2014 | Falsafi | G06F 12/0813 711/122 |

FOREIGN PATENT DOCUMENTS

| | | |
|---|---|---|
| JP | 2010-199800 A | 9/2010 |
| WO | 2010/103818 A1 | 9/2010 |

OTHER PUBLICATIONS

International Search Report for corresponding International Application No. PCT/JP2012/006397 mailed Nov. 6, 2012.

* cited by examiner

*FIG.12*

| PARAMETERS THAT DETERMINE PACKET TRANSMISSION STANDBY PERIOD | HOW TO DETERMINE THE PACKET TRANSMISSION STANDBY PERIOD |
|---|---|
| NUMBER OF HOPS (H) OF ROUTER IN TRANSMISSION STANDBY STATE | THE SMALLER NUMBER OF HOPS, THE SHORTER STANDBY PERIOD IS SET TO BE AND THE EARLIER PACKETS ARE DISCARDED.<br>BY GIVING HIGHER PRIORITY TO DISCARDING THE PACKETS RATHER THAN PUTTING THEM ON HOLD, COPE WITH SUCH SITUATION ON THE SUPPOSITION THAT IT WOULD BE MORE EFFECTIVE TO RECOVER THE PACKETS BY RE-SENDING THEM |
| NUMBER OF TRAFFIC FLOWS (F) THAT USE THE SAME TRANSMISSION ROUTE IN COMMON | THE STANDBY PERIOD IS SHORTENED AND THE PACKETS ARE DISCARDED EARLIER IF LOAD ON THE ROUTERS IS RAPIDLY INCREASING WHEN A SYSTEM FAILURE OCCURS, FOR EXAMPLE. |
| EVALUATION FORMULA (V) | V = THE NUMBER OF HOPS TO MAKE FROM THE BUS MASTER × THE NUMBER OF FLOWS THAT USE THE SAME TRANSMISSION LINE IN COMMON (V = H × F) |

FIG.14
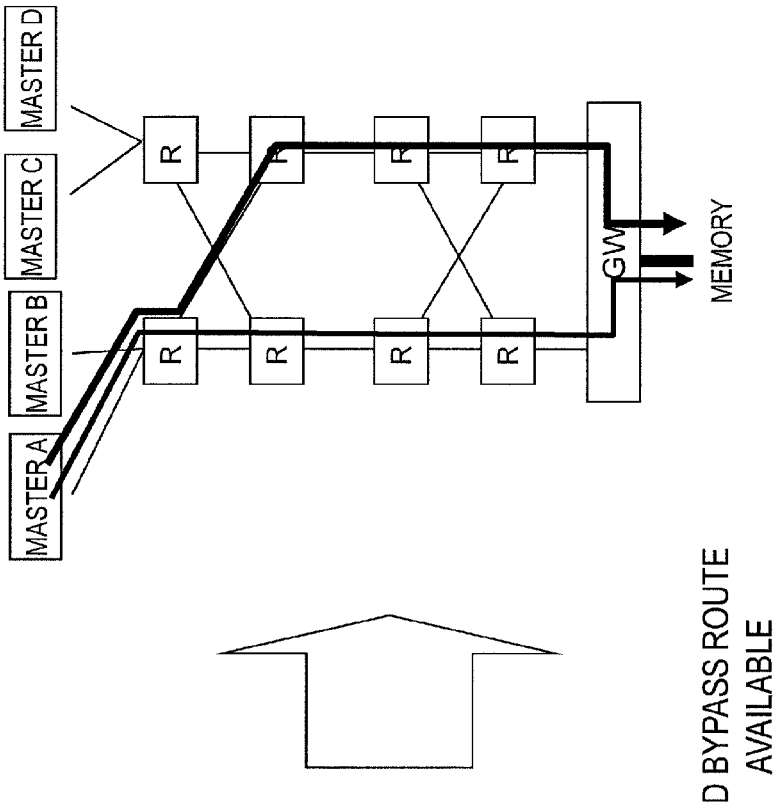
(a)
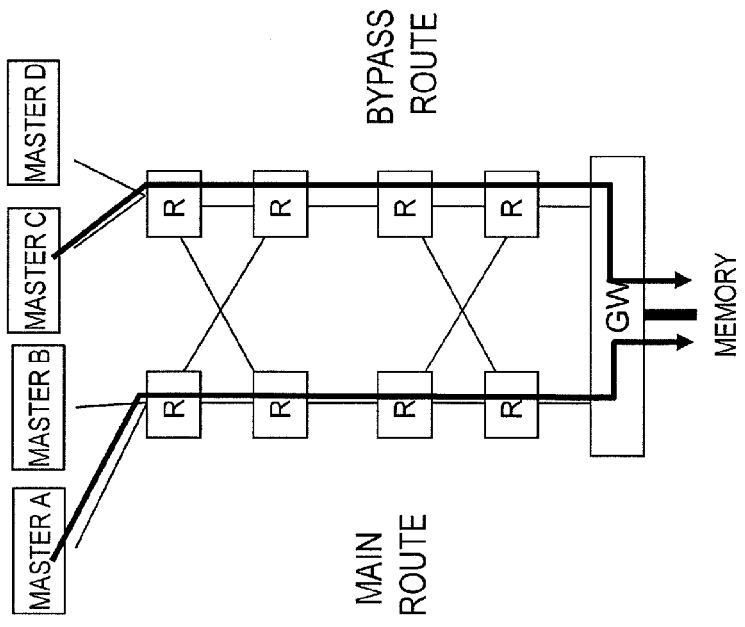
(b)

ROUTER, METHOD FOR CONTROLLING THE ROUTER, AND COMPUTER PROGRAM

This is a continuation of International Application No. PCT/JP2012/006397, with an international filing date of Oct. 4, 2012, which claims priority of Japanese Patent Application No. 2011-226938, filed on Oct. 14, 2011, the contents of which are hereby incorporated by reference.

1. TECHNICAL FIELD

The present application relates to a bypass transmission control method and bypass transmission system for use in a semiconductor system with a bus.

2. DESCRIPTION OF THE RELATED ART

There are various methods for performing a transmission control on a data transmission system including a bus. Portions (a) and (b) of FIG. 1 show examples of conventional transmission control methods for a semiconductor system. Specifically, portion (a) of FIG. 1 illustrates an example of a conventional lumped bus control. According to such a lumped bus control as shown in portion (a) of FIG. 1, a number of bus masters and a memory are connected together with a single bus, and accesses to the memory by the respective bus masters are arbitrated by an arbiter. By adopting such a configuration, data can be transmitted while avoiding traffic flow interference between the bus masters and the memory. However, as the functionality of an integrated circuit has been further improved and as the number of cores in an integrated circuit has been further increased these days, the scale of the circuit has become even larger and the traffic flow through the transmission route has gotten even more complicated. As a result, it has become increasingly difficult to design an integrated circuit by such a lumped bus control.

Meanwhile, semiconductor integrated circuits with distributed buses have been developed one after another lately by introducing parallel computerized connection technologies and network control technologies such as ATM (asynchronous transfer mode). Portion (b) of FIG. 1 illustrates an example of a distributed bus control. In a semiconductor integrated circuit with distributed buses, a number of routers (R) are connected together with multiple buses to form a mesh. Recently, people have been working on a so-called "Network on Chip (NoC)" in which the traffic flows in a large-scale integrated circuit are transmitted through a number of buses by adopting the distributed buses such as the ones shown in portion (b) of FIG. 1.

FIG. 2 illustrates an exemplary configuration for a router for use in a NoC, parallel computers, an ATM network, and so on. The data to be transmitted (i.e., traffic data) is divided into a number of small units such as packets or cells, each of which is transmitted to its destination node by way of multiple routers. The router shown in FIG. 2 includes a plurality of input ports 0 through 3, a plurality of input buffers, a plurality of output ports 0 through 3, and a crossbar switch that connects together the respective input buffers and the respective output ports. The router shown in FIG. 2 further includes an arbiter which performs a control operation by changing connection of the crossbar switch according to the destination of data. The data that has been input to this router through Input Ports 0 through 3 is temporarily stored in the input buffers. By getting the crossbar switch turned by the arbiter in this manner, the router relays the data that is stored in the buffers to its destination.

In a router, sometimes the traffic data transfer processing is delayed due to standby at respective buffers or processing delay caused by the crossbar switch. The larger the scale of a network, the larger the number of routers included there and the more significant and the more serious the delay would be. Considering that there are some applications that deal with highly urgent traffic data (e.g., applications for urgent information notification), the problem is how to reduce and minimize such a delay.

In a general network that uses the Ethernet™ line, for example, if a router finds packets overflowing out of a buffer, then the router automatically discards those overflowing packets.

In an NoC that uses semiconductor buses, on the other hand, the routers do not discard packets unlike in a general network. The reason is that as bus masters to be connected to the network can be predicted in advance and the size of the traffic data to flow through the network can be estimated, the NoC can be designed to avoid discarding packets.

Still, the buses could be overloaded due to some system failure or design errors. Also, when packets should be transmitted through a bypass route provided on an NoC, it is difficult to design the network in advance in the first place. Even so, the NoC should still meet the required specification as a whole.

Japanese Patent Publication No. 3816531 (herein referred to as "Patent Document No. 1) discloses how the transmission route should be chosen to obtain the NoC described above. FIG. 3 is a schematic representation illustrating how to choose an alternative transmission route if data cannot be transmitted through the originally selected transmission route. As shown in FIG. 3, (1) if there is no response within a predetermined period of time on the transmission route (i.e., if timeout has occurred), then (2) one of multiple predetermined routes is chosen according to the distribution of probability of the predetermined routes and packets are re-transmitted. Patent Document No. 1 discloses a method for choosing a transmission route which would achieve high transmission efficiency easily.

Meanwhile, Japanese Laid-Open Patent Publication No. 2000-286893 (herein referred to as "Patent Document No. 2) discloses a technique for discarding packets. Specifically, Patent Document No. 2 proposes that the standby period to allow before the packets are discarded be determined according to the degree of priority in order to keep the information always updated.

SUMMARY

The packet transmission efficiency achieved by the related art is not sufficiently high but should be further improved.

A non-limiting exemplary embodiment of the present application provides a technique for transmitting packets efficiently by seeing if any transmission obstruction has occurred.

In one general aspect, a router as an embodiment of the present invention is provided for an integrated circuit that has distributed buses and is arranged on a transmission route that leads from a transmission node to a reception node on the distributed buses in order to relay data. The distributed buses include first and second routes, each leading from the router to the reception node. The router includes: an input buffer having a plurality of data storage sections to store data; an output section which outputs the data that is stored in the input buffer and which has a plurality of output ports; a routing processing section which analyzes the data to choose one of the output ports through which the data is going to be output;

a buffer allocator which associates a particular one of the data storage sections that store the data with one of the data storage sections of the input buffer of a next-stage router which is connected to the output port that has been chosen by the routing processing section; a switch allocator which arranges a schedule to transfer the data in accordance with the association that has been made by the buffer allocator; and a notifying section which sends a data transfer permission request to a second router on the first route and a third router on the second route and which determines whether or not the request is approved before a predetermined standby period passes to see if there is any abnormality in the first and second routes.

According to an embodiment of the present invention, packets can be transmitted efficiently by seeing if any transmission obstruction has occurred.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

Portions (a) and (b) of FIG. 1 show examples of conventional transmission control methods for a semiconductor system.

FIG. 2 illustrates an exemplary configuration for a router for use in a NoC, parallel computers, an ATM network, and so on.

Figure 5:
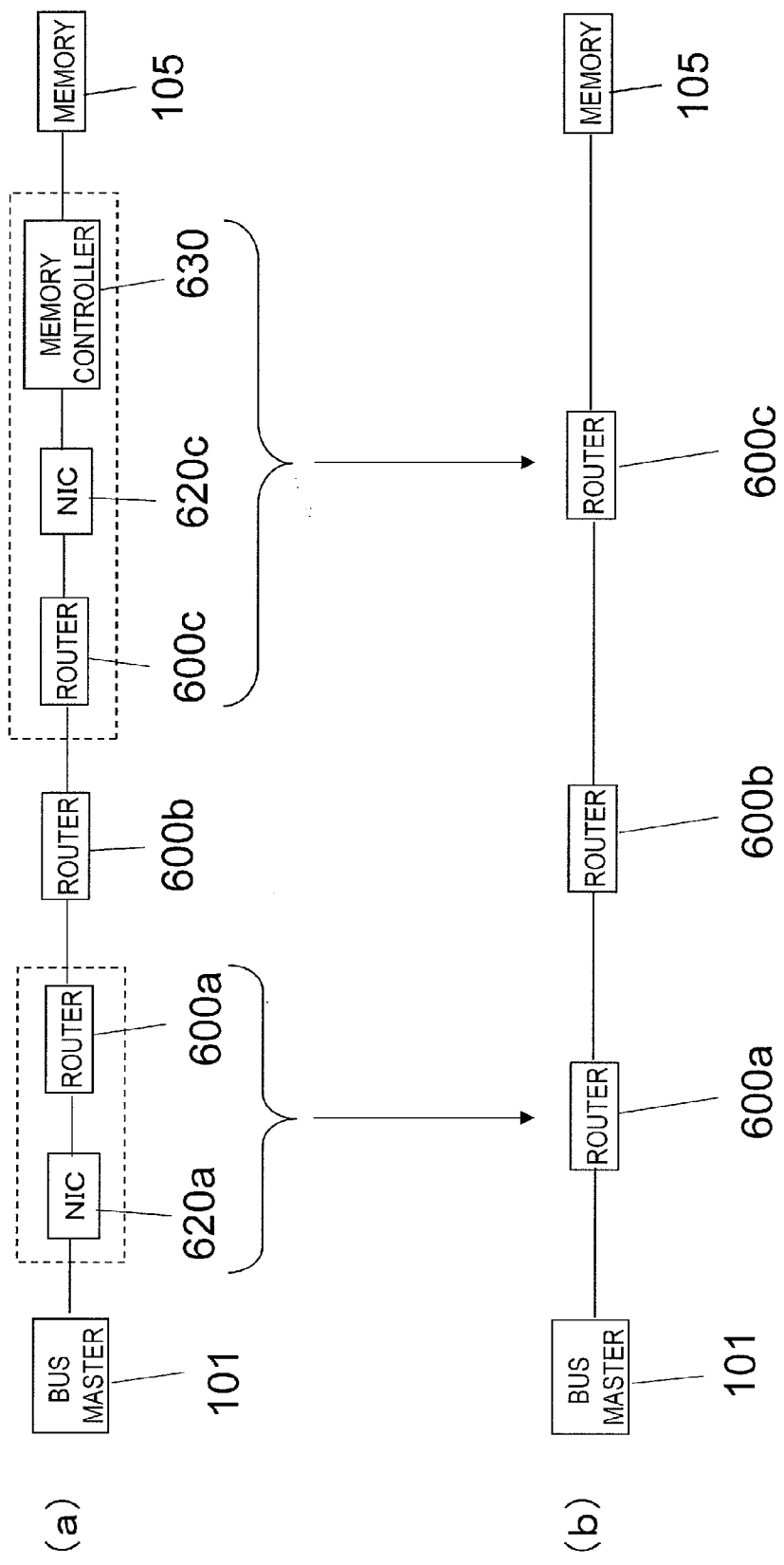

Portions (a) and (b) of FIG. 5 are a block diagram illustrating a part of a data transmission system according to an exemplary embodiment of the present invention.

Figure 6:
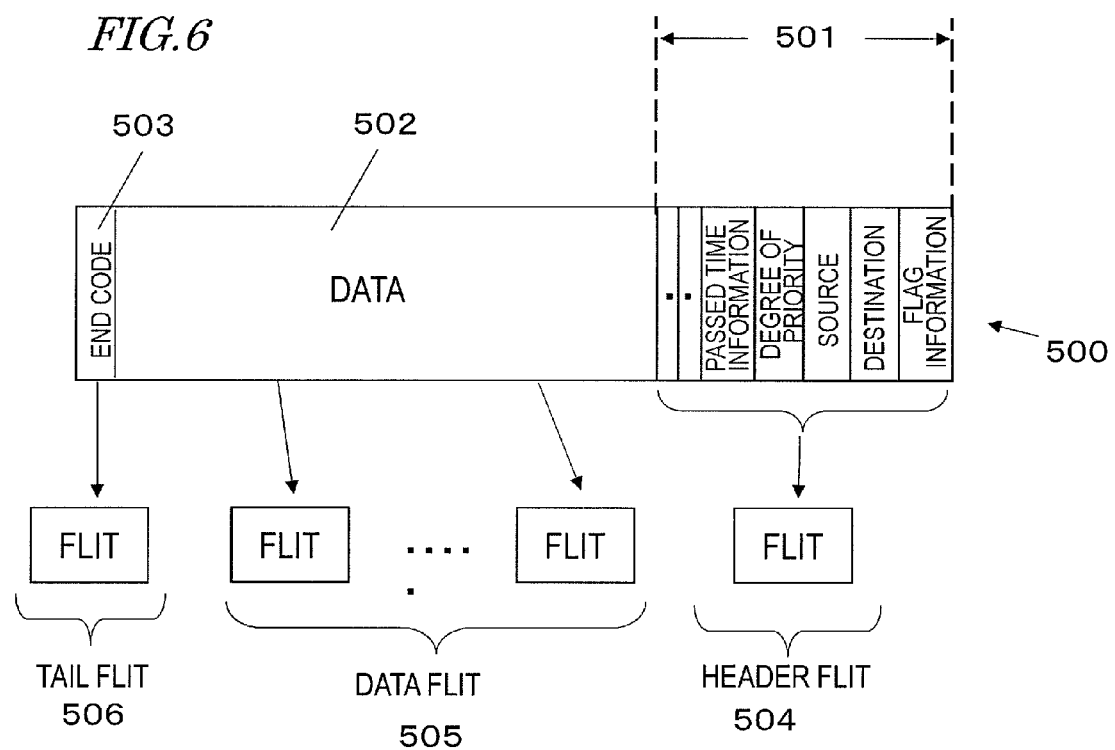

FIG. 6 illustrates an exemplary transmission format for a packet 500 and how the packet 500 may be divided into a plurality of flits.

Figure 7:
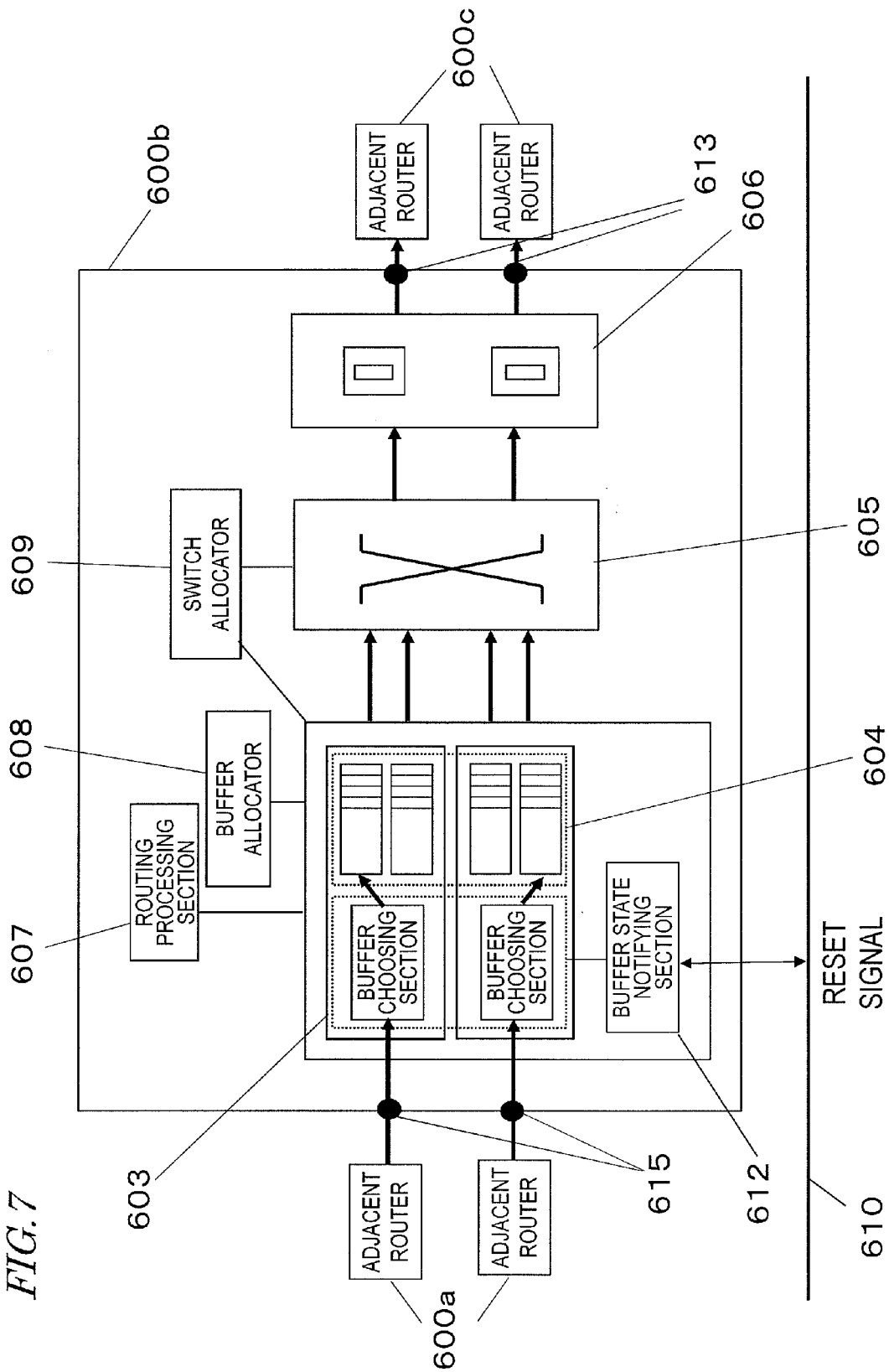

FIG. 7 illustrates a general configuration for a router according to an exemplary embodiment of the present invention.

Figure 8:
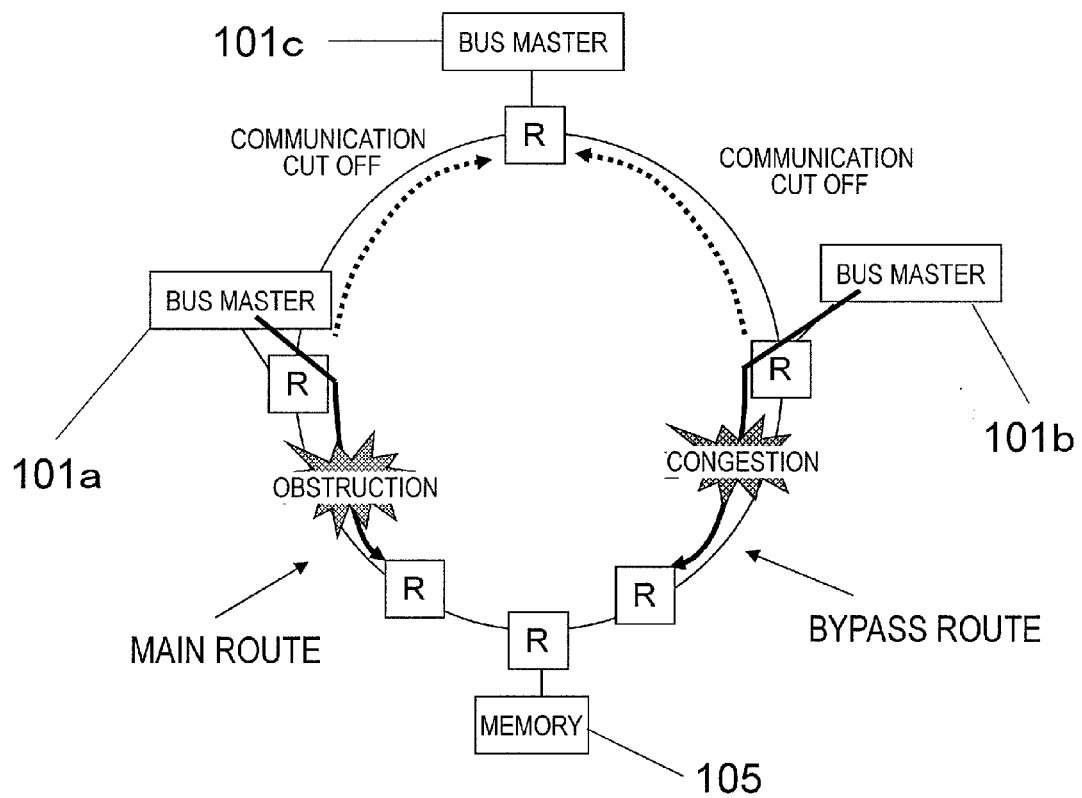

FIG. 8 illustrates a data transmission system in which there are obstruction and congestion.

Figure 9:
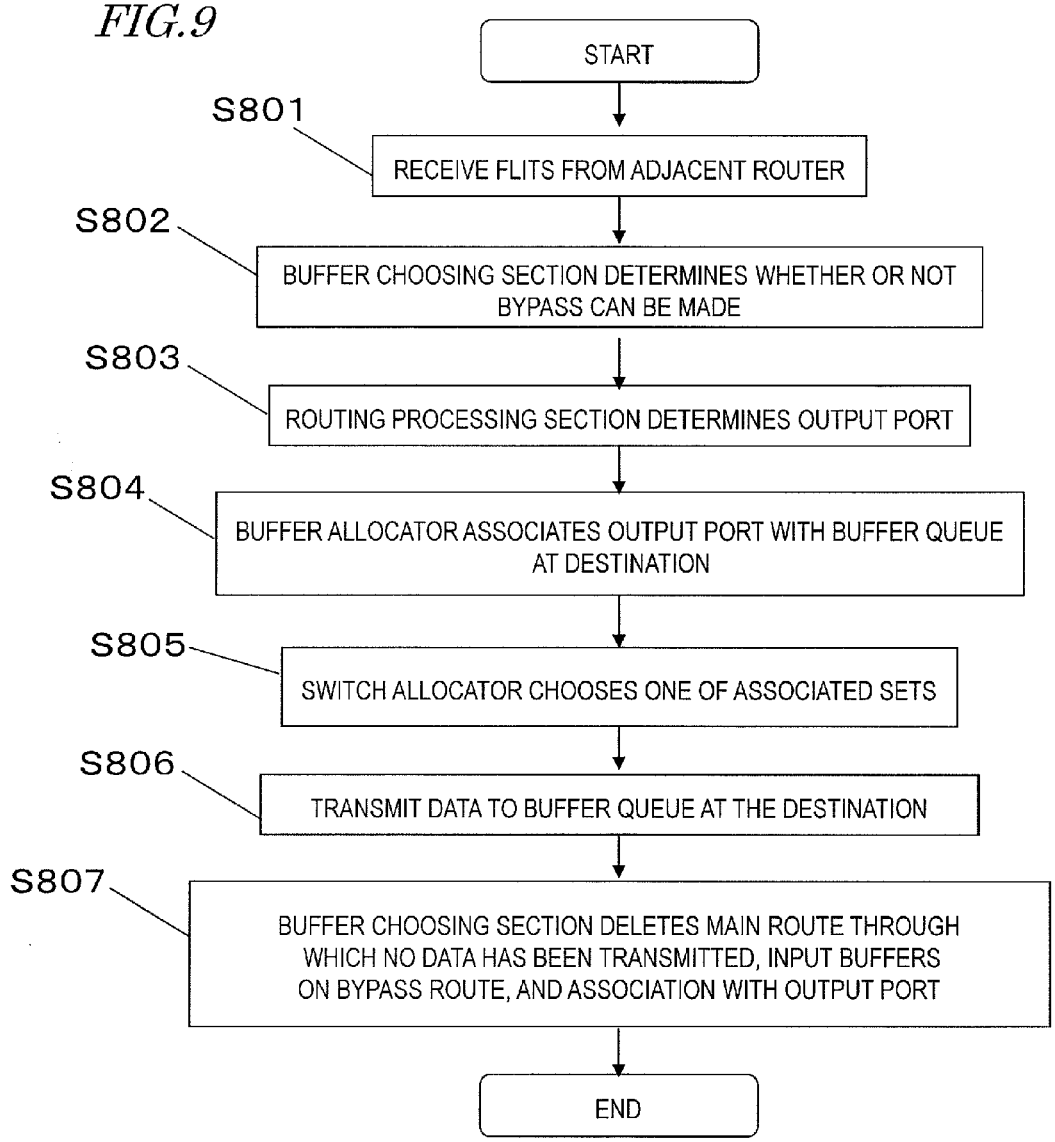

FIG. 9 is a flowchart showing how the router 600b operates.

Figure 10:
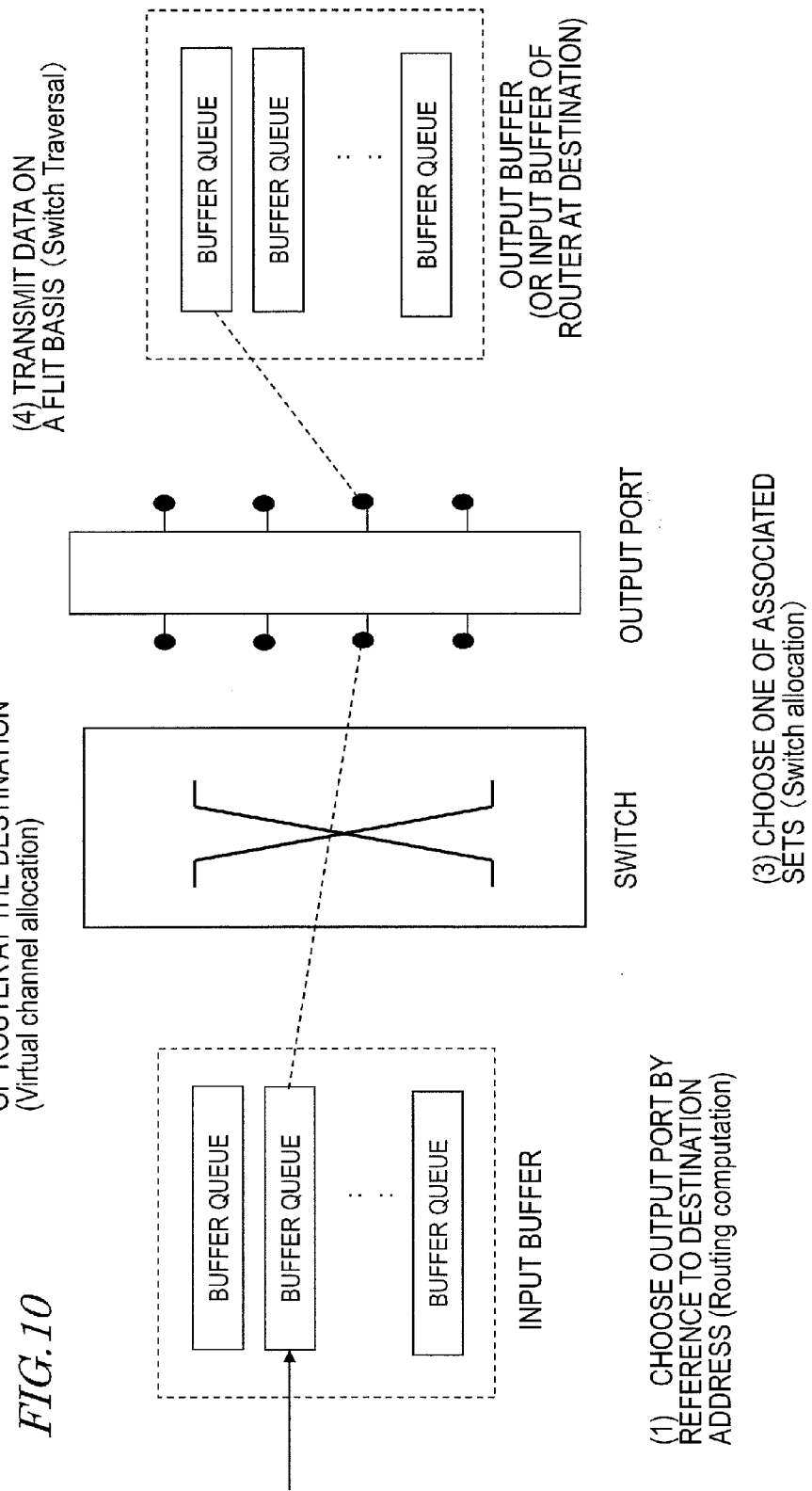

FIG. 10 illustrates the procedure of processing to be carried out by a general router.

Figure 11:
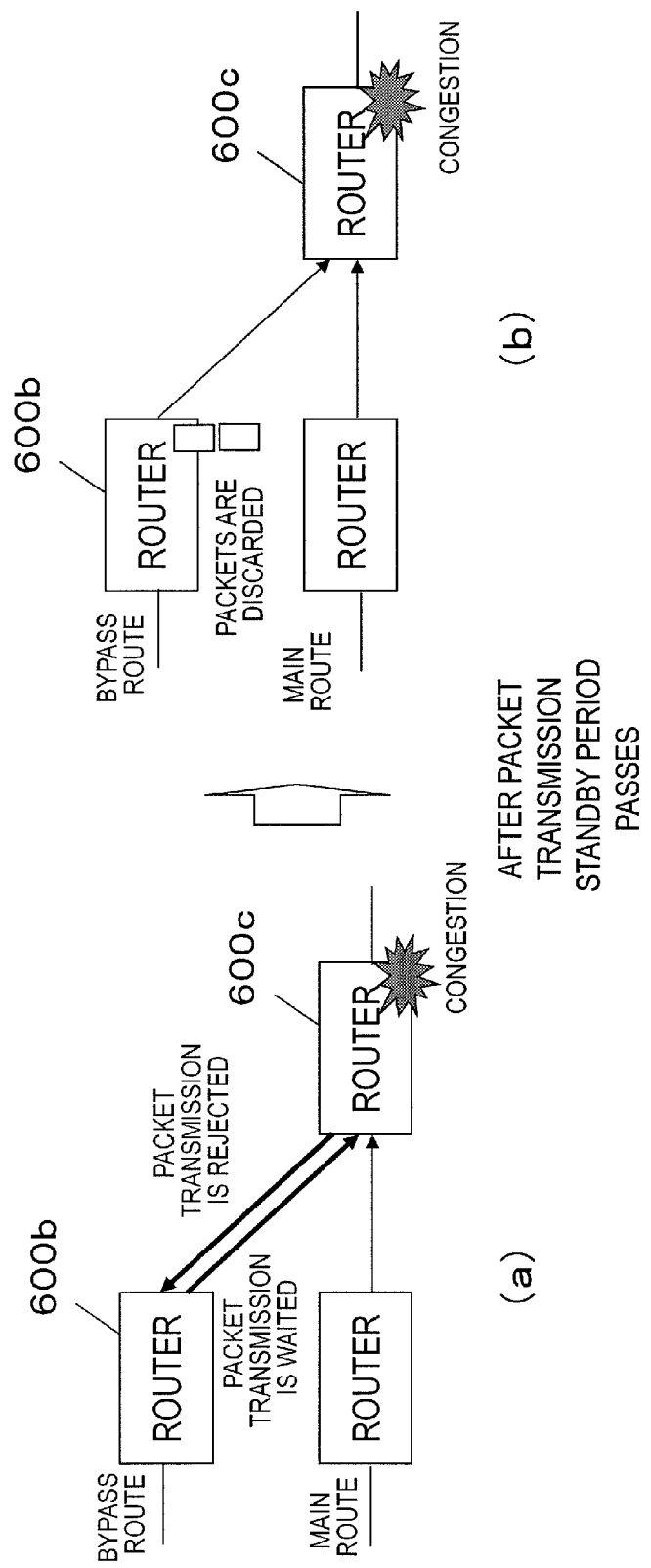

Portions (a) and (b) of FIG. 11 show what the packet transmission standby period is.

FIG. 12 shows correspondence between parameters that determine the packet transmission standby period and the method of determining the packet transmission standby period.

Figure 13:
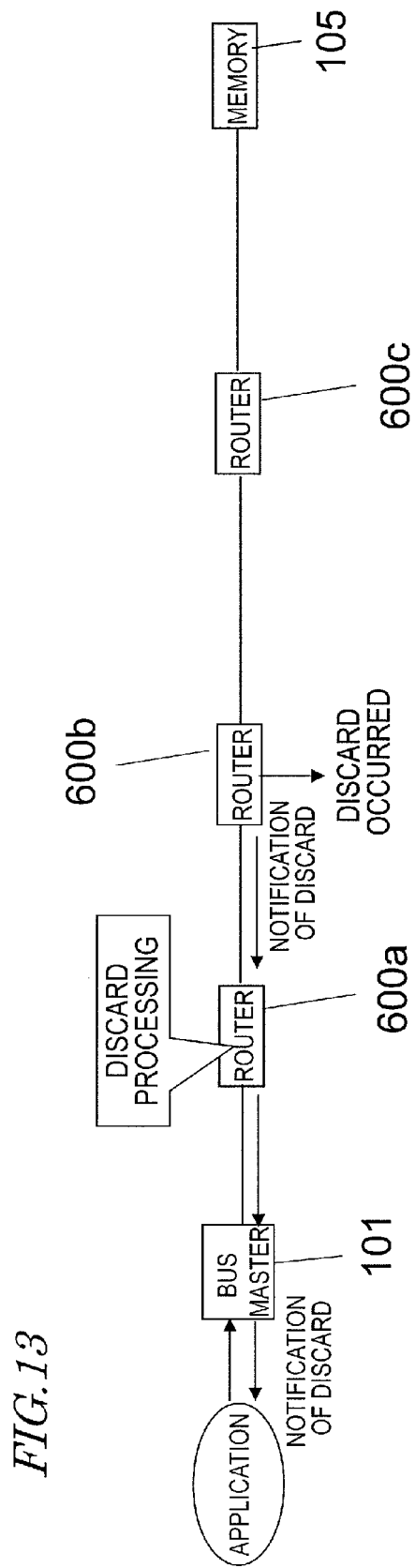

FIG. 13 illustrates how other nodes are notified that packets have been discarded by the router 600b.

Portions (a) and (b) of FIG. 14 illustrate an exemplary application of an exemplary embodiment of the present invention to parallel transmission using a bypass route.

Figure 15:
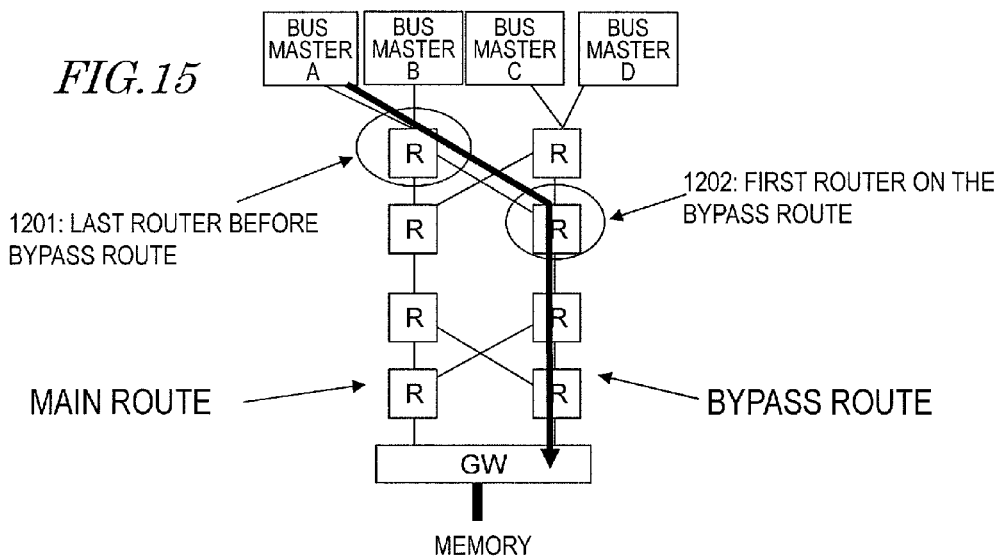

FIG. 15 illustrates generally how to perform bypass processing according to an exemplary embodiment of the present invention.

Figure 16:
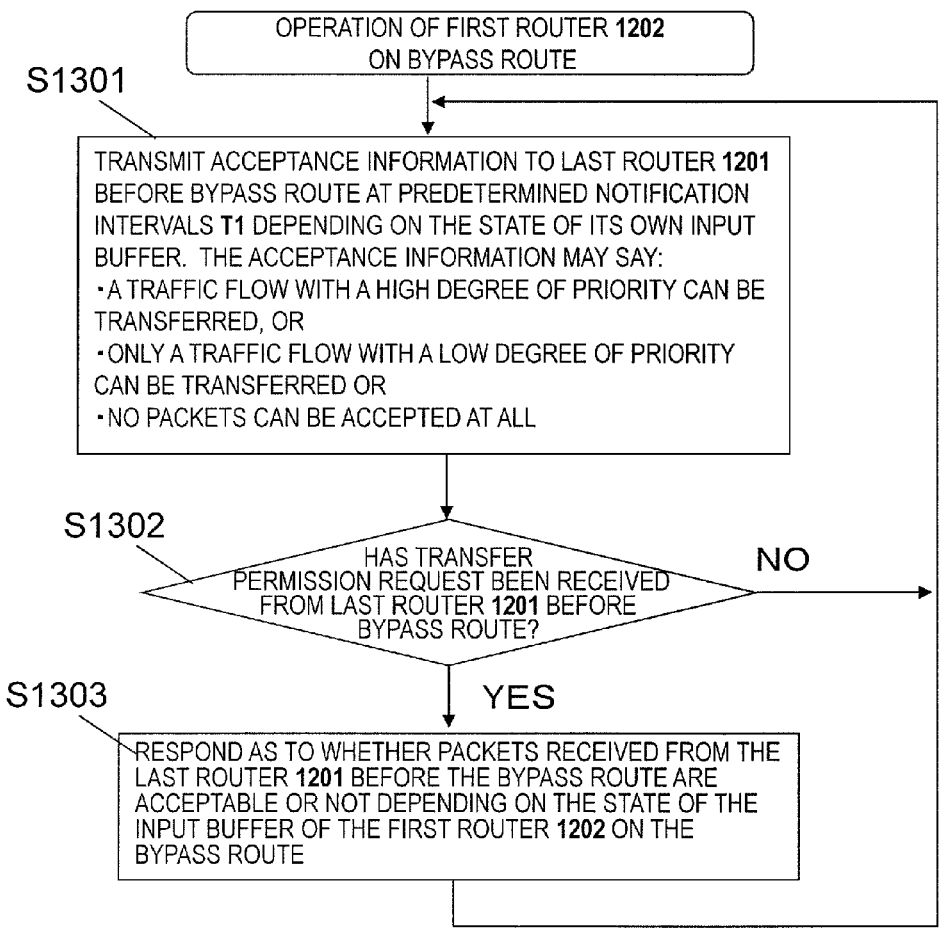

FIG. 16 shows the procedure of operation of the first router 1202 on the bypass route.

Figure 17:
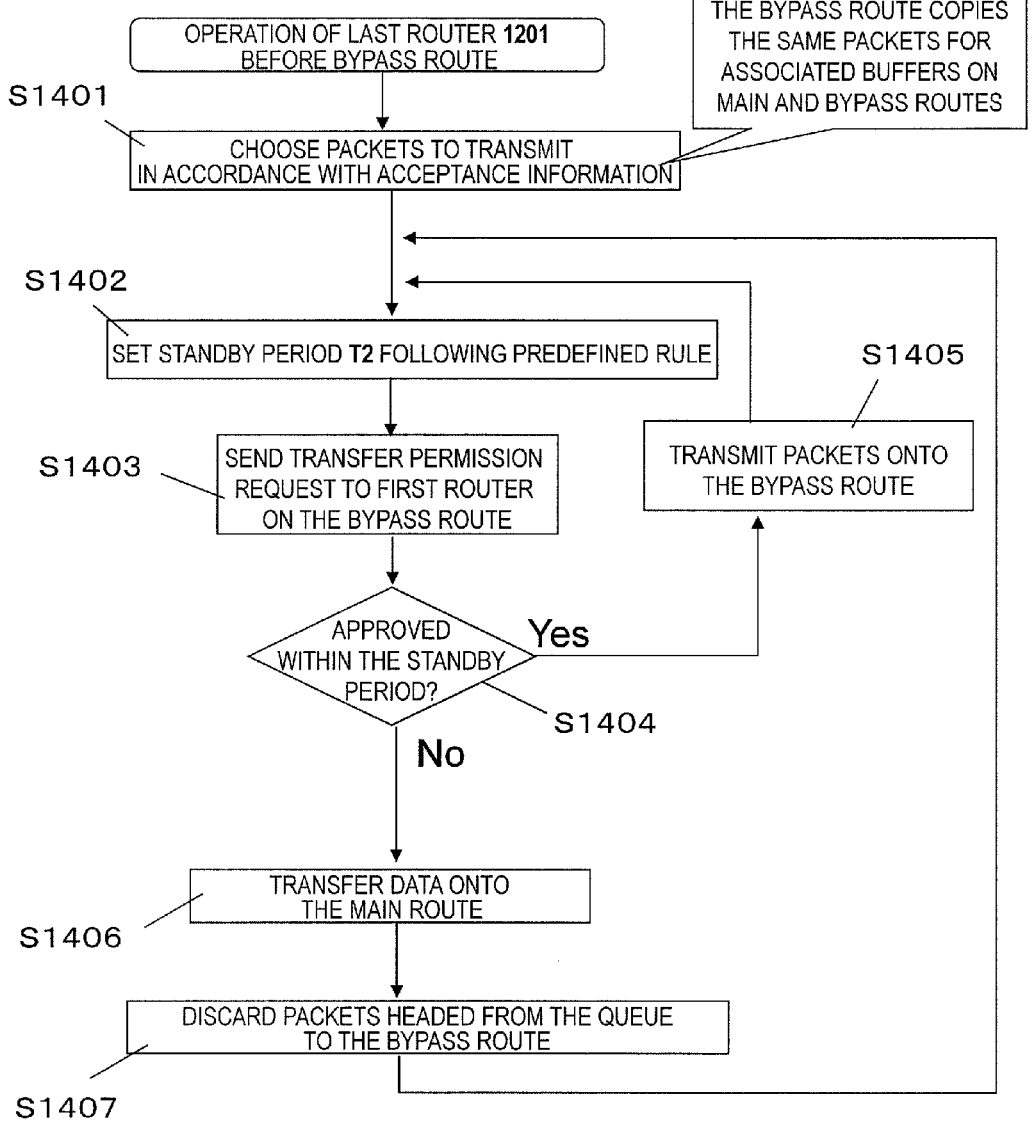

FIG. 17 shows a procedure of operation of the last router 1201 before the bypass route.

Figure 18:
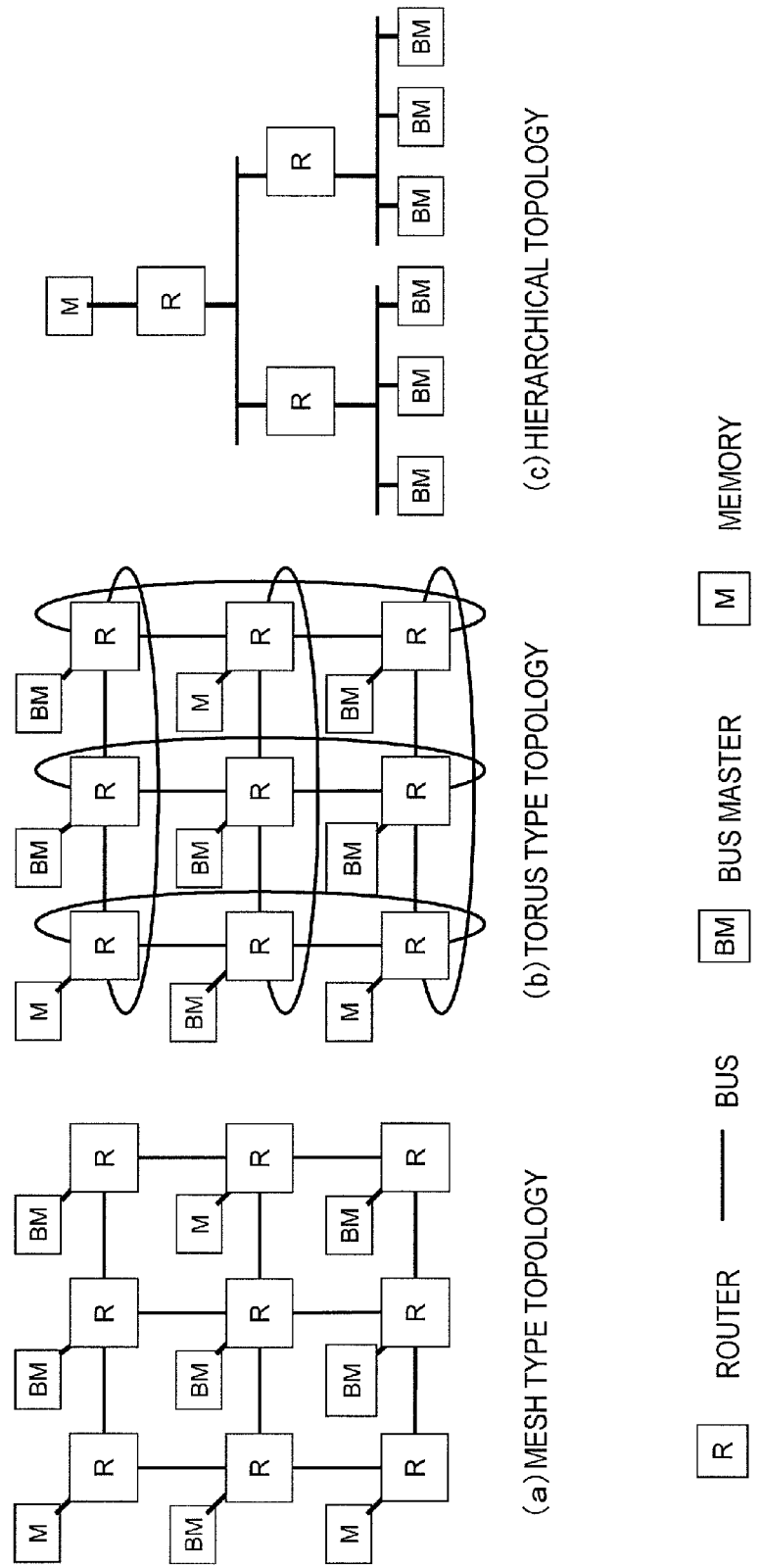

Portions (a), (b) and (c) of FIG. 18 illustrate respective examples of a mesh-type topology, a torus-type topology, and a hierarchical topology.

Figure 19:
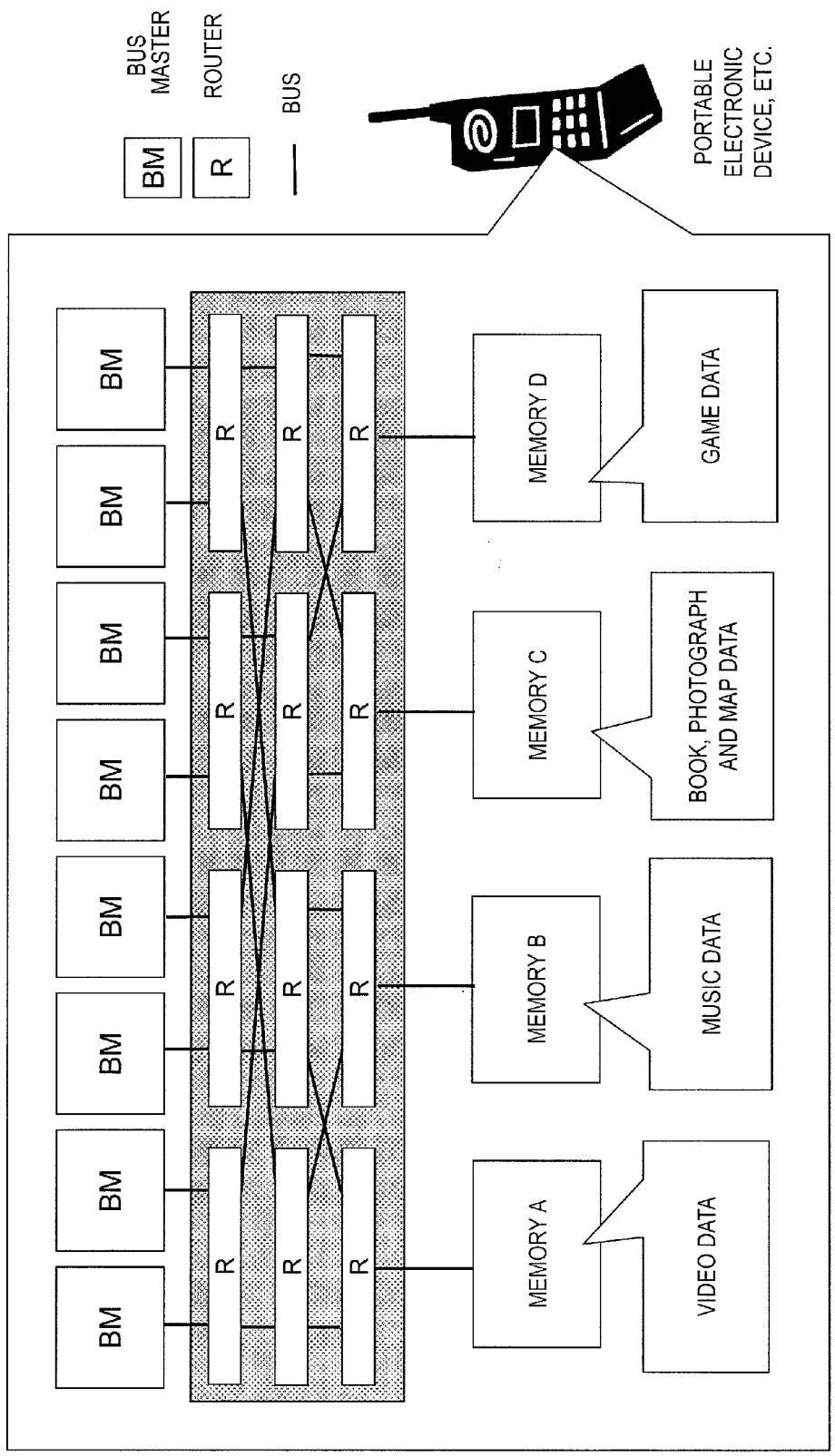

FIG. 19 illustrates an example in which multiple bus masters and multiple memories on a semiconductor circuit are connected together with distributed buses.

Figure 20:
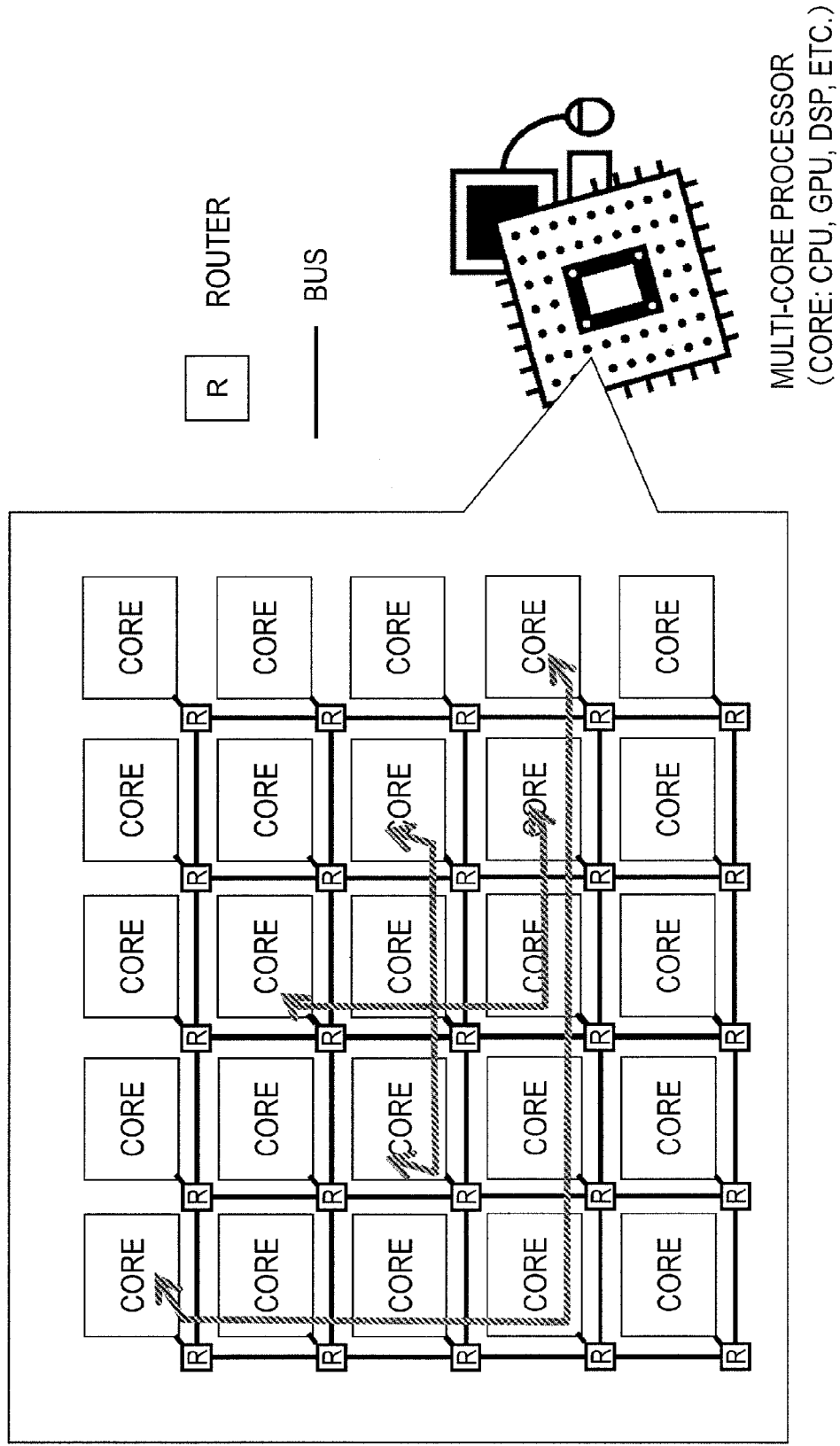

FIG. 20 illustrates a multi-core processor in which a number of core processors such as a CPU, a GPO and a DSP are arranged in a mesh pattern and connected together with distributed buses in order to improve the processing performance of these core processors.

DETAILED DESCRIPTION

The present inventors looked into the problems with the related art described above.

According to the conventional NoC technologies, by monitoring how transmission routes between the transmission and reception nodes are used, one of the transmission routes is selected. That is why if there is any abrupt variation in traffic, it is difficult to catch up with such a variation. In addition, since the quality (such as throughput and transmission delay) required for traffic is not taken into account, the transmission processing could not be in time when traffic should be transmitted strictly within a short time delay.

To overcome these problems, an appropriate bypass route may be selected as disclosed in Patent Document No. 1. However, such a bypass route is not always provided in advance and an appropriate bypass route cannot always be selected. The reason is that such bypassing could newly cause congestion. In addition, such a situation is highly likely to be caused if the bus is overloaded due to some system failure or design errors.

Furthermore, if the standby period to allow before packets are discarded is determined according to the degree of priority as disclosed in Patent Document No. 2, it is impossible to cope with a situation where every packet under transmission processing has the same degree of priority.

An embodiment of the present invention is outlined as follows:

A router as an embodiment of the present invention is provided for an integrated circuit that has distributed buses and is arranged on a transmission route that leads from a transmission node to a reception node on the distributed buses in order to relay data. The distributed buses include first and second routes, each leading from the router to the reception node. The router includes: an input buffer having a plurality of data storage sections to store data; an output section which outputs the data that is stored in the input buffer and which has a plurality of output ports; a routing processing section which analyzes the data to choose one of the output ports through which the data is going to be output; a buffer allocator which associates a particular one of the data storage sections that store the data with one of the data storage sections of the input buffer of a next-stage router which is connected to the output port that has been chosen by the routing processing section; a switch allocator which arranges a schedule to transfer the data in accordance with the association that has been made by the buffer allocator; and a notifying section which sends a data transfer permission request to a second router on the first route and a third router on the second route and which determines whether or not the request is approved before a predetermined standby period passes to see if there is any abnormality in the first and second routes.

In one embodiment, unless the request is approved before the predetermined standby period passes, the notifying section instructs at least one of the input buffer and the output section to discard the data.

In another embodiment, if the request is approved before the predetermined standby period passes, the notifying section gets the data transmitted through an output port that is connected to one of the first and second routes that has approved the request.

In still another embodiment, if both the second router on the first route and the third router on the second route approve the request before the predetermined standby period passes, the notifying section gets the data transmitted through an output port that is connected to one of the first and second routes that has approved the request earlier than the other.

In yet another embodiment, the distributed buses further have a resetting common line, to which the second router on the first route and/or the third router on the second route is/are connected. Unless the request is approved before the predetermined standby period passes, the notifying section notifies at least one of the second router on the first route, the third router on the second route, the transmission node and the reception node of abnormality through the resetting common line.

In yet another embodiment, the distributed buses further have a resetting common line. On being notified of abnormality in the transmission route through the resetting common line, the notifying section discards the data that is stored in the input buffer.

In yet another embodiment, the notifying section defines the predetermined standby period to be the period of time that is determined by the number of routers that are present on the transmission route leading from the transmission node to the reception node.

In yet another embodiment, the router is arranged on a transmission route leading from a bus master as the transmission node to a memory as the reception node and relays the data.

A router controlling method as another embodiment of the present invention is a method for controlling a router which is provided for an integrated circuit that has distributed buses and which is arranged on a transmission route that leads from a transmission node to a reception node on the distributed buses in order to relay data. The distributed buses include first and second routes, each leading from the router to the reception node. The router includes: an input buffer having a plurality of data storage sections to store data; an output section which outputs the data that is stored in the input buffer and which has a plurality of output ports; a routing processing section which analyzes the data to choose one of the output ports through which the data is going to be output; a buffer allocator which associates a particular one of the data storage sections that store the data with one of the data storage sections of the input buffer of a next-stage router which is connected to the output port that has been chosen by the routing processing section; and a switch allocator which arranges a schedule to transfer the data in accordance with the association that has been made by the buffer allocator. The method includes the steps of: sending a data transfer permission request to a second router on the first route and a third router on the second route; and determining whether or not the request is approved before a predetermined standby period passes to see if there is any abnormality in the first and second routes.

A computer program as still another embodiment of the present invention is designed to carry out a simulation on a router which is provided on a transmission route leading from a transmission node to a reception node on distributed buses in order to relay data. The computer program makes a computer perform the router controlling method described above.

Optionally, a transfer permission request may be transmitted onto a main route that is the first route, and approval by a router on the main route may be waited for at most until the standby period passes. The router to which the transfer permission request is sent may be the most closely adjacent router, for example. The transfer permission request may be sent to the router on the main route and to a router on a bypass route that is the second route at the same time. If the request is approved within a predetermined standby period, then data is transmitted onto the transmission route on which the router has approved the request earlier. As a result, the less congested transmission route can be chosen, and the delay would decrease and the throughput would increase. Also, the main route and the bypass route are not always fixed. Alternatively, the main route and bypass route may be defined to be different ones either on a master by master basis or on a use case basis. Furthermore, there may be multiple bypass routes. For example, in a mesh network, three bypass routes may be defined for each single main route. In a ring bus, on the other hand, one main route and one bypass route may be defined.

Hereinafter, an exemplary embodiment of a router according to the present invention will be described with reference to the accompanying drawings.

If a packet transmission delay has been caused, the router of this embodiment performs processing to increase the transmission efficiency.

General methods for processing packets to be transmitted at the time of congestion include putting the packets in the standby state and discarding the packets. If the packets are put in the standby state at the time of congestion, no packets would be lost. However, the influence of the congestion could spread instead.

On the other hand, if the packets are discarded at the time of congestion, the congestion would be cleared up more quickly. Nevertheless, the lost packets should be recovered instead.

If the packets were put in the standby state too often, congestion would be caused so easily that the transmission quality would be debased too much. Also, if too many packets were discarded, then the packets could not be transmitted with stability and the transmission quality would be debased too frequently.

Instead of putting the packets in the standby state OR discarding the packets, a router according to this embodiment puts the packets in the standby state AND discards the packets with an adequate balance struck between them, thereby increasing the transmission efficiency of the packets.

Hereinafter, the configuration and operation of the router will be described in detail.

<1. System Configuration>

Figure 1:
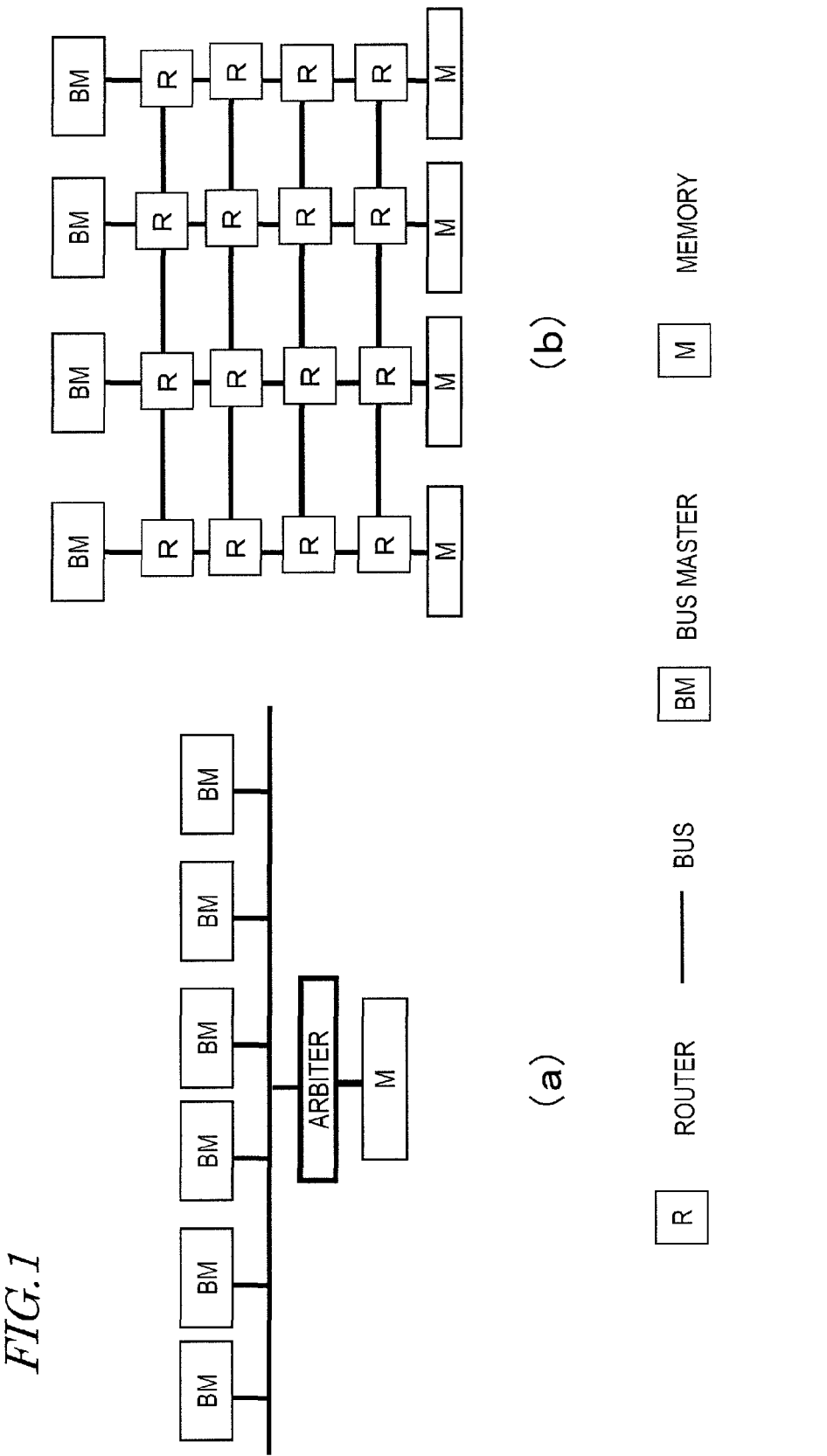
Figure 2:
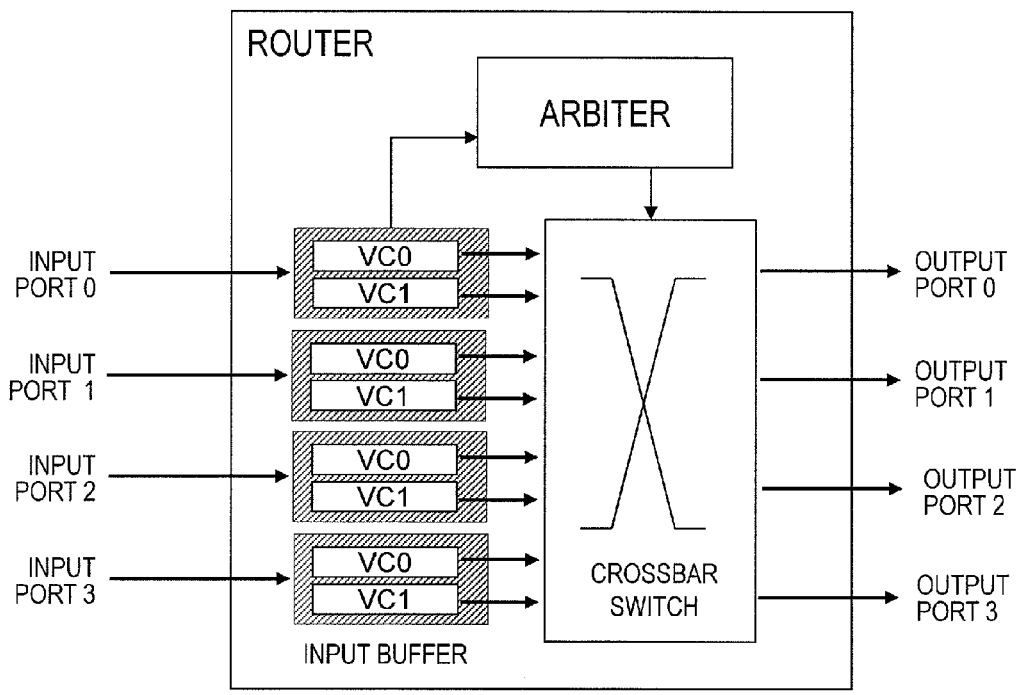
Figure 3:
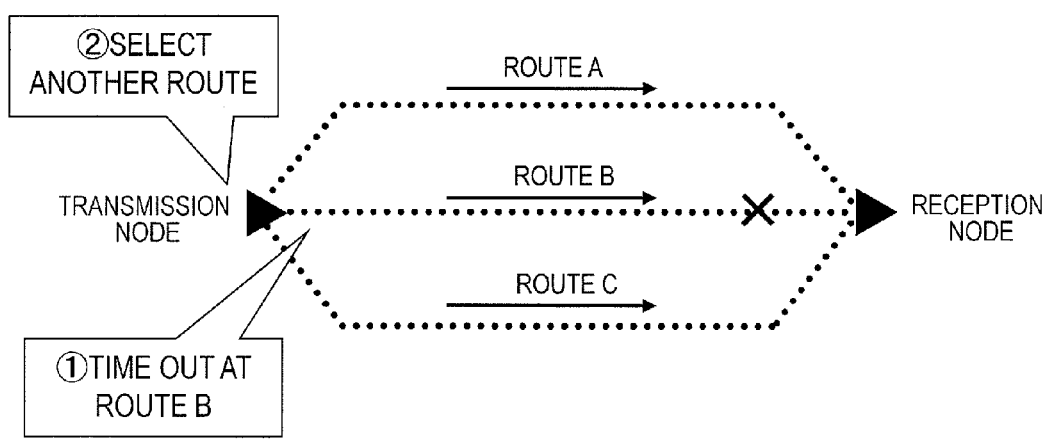
FIG. 3 shows a schematic representation illustrating how to choose an alternative transmission route if data cannot be transmitted through the originally selected transmission route.
Figure 4:
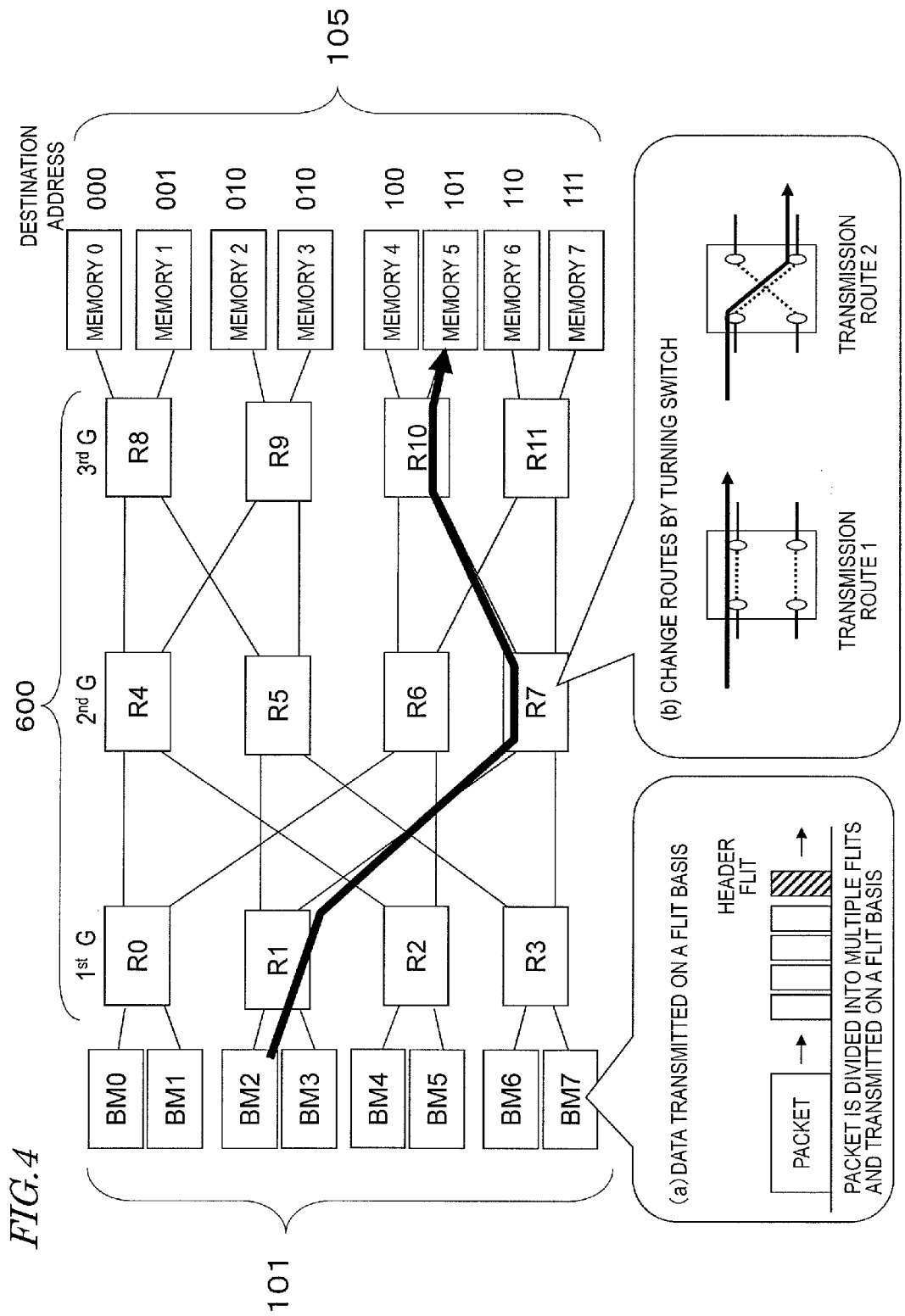
FIG. 4 illustrates an exemplary configuration for a data transmission system that uses routers according to an exemplary embodiment of the present invention.

FIG. 4 illustrates an exemplary configuration for a data transmission system that uses routers according to this embodiment. The system shown in FIG. 4 includes a plurality of bus masters (BMs) 101 as transmission nodes and a plurality of memories 105 as reception nodes. Those bus masters 101 and memories 105 are connected together in multiple stages with buses via a number of routers 600. In this manner, the transmission system shown in FIG. 4 forms a multistage interconnection network (MIN). In this embodiment, those bus masters 101 function as first nodes according to the present disclosure and those memories 105 function as second nodes according to the present disclosure.

In this embodiment, the bus masters 101 are devices that can perform a data transfer control using a bus and may be processors or DSPs, for example. On the other hand, the memories 105 may be semiconductor memories such as DRAMs or SRAMs. Alternatively, in another embodiment of the present disclosure, the memories 105 may also be arranged so as to connect together non-memory nodes such as processors, DSPs and I/Os. The routers 600 may be implemented as semiconductor circuits, for example, and have the function of relaying data to be transmitted between those bus masters 101 and memories 105.

In the exemplary configuration shown in FIG. 4, eight bus masters (BM0 through BM7), twelve routers (R0 through R11), and eight memories (Memories 0 through 7) are connected together with buses. Those twelve routers are classified into the following three groups. The first group ($1^{st}$ G) consists of four routers (R0, R1, R2 and R3) that are connected to the eight bus masters 101. The second group ($2^{nd}$ G) consists of four routers (R4, R5, R6 and R7) which are connected to behind the first group. And the third group consists of four routers (R8, R9, R10 and R11) which are connected to behind the second group and also connected to the eight memories.

Data is transmitted from a bus master 101 to a memory 105 by the packet exchange method. As shown in portion (a) of FIG. 4, each bus master is supposed to divide a packet to transmit into the smallest units called "flits" and then transmits them to an adjacent router. The first one of those flits obtained by dividing one packet, which is transmitted earlier than any other flit, is called a "header flit", in which described are flag information indicating that this is the head of a packet and the address information of the packet's destination. The data structures of packets and flits according to this embodiment will be described in detail later.

Each of those routers that form parts of the multistage interconnection network shown in FIG. 4 includes a crossbar switch with two inputs and two outputs. Each router can change the input and output combinations by turning the crossbar switch as shown in portion (b) of FIG. 4. In this manner, the traffic flow can pass selectively through one of the two transmission routes (Transmission Routes #1 and #2). It should be noted that if the destinations cannot be reached unless both of these two transmission routes are taken, then the router may output the two traffic flows through both of the two transmission routes at the same time. In this multistage interconnection network, by turning the crossbar switch at each router, one or more transmission routes can always be formed between every bus master and every memory.

In general, to connect every one of N bus masters and every one of M memories together with crossbar switches, N×M switches are needed. In this description, a "switch" refers herein to something that is arranged at an intersection between a set of communications lines that run parallel with each other in one direction and another set of communications lines that run parallel with each other in another direction and that can form a communications line dynamically by being turned ON and OFF. Generally speaking, the greater the number of bus masters or memories, the more steeply the number of switches needed rises. On the other hand, the multistage interconnection network is characterized by connecting crossbar switches with a small number of inputs and outputs in a hierarchical pattern so that the connection between the bus masters and memories can be changed with a much smaller number of switches.

In the configuration shown in FIG. 4, if data is to be transmitted from BM2 to Memory 5, for example, then BM2 divides a packet, which specifies the address (101) of Memory 5 as the destination address, into a plurality of flits and transmits them to the router R1. Those divided flits are transmitted to Memory 5 via the routers R1, R7 and R10. Memory 5 receives those flits from the router R10 and restores the original packet based on those flits. By performing this series of processing steps, data is transmitted from BM2 to Memory 5.

It should be noted that routers according to this embodiment do not have to be applied to an integrated circuit that forms a multistage interconnection network such as the one shown in FIG. 4 but may also be applied to an integrated circuit with any other topology as well. Also, although data is supposed to be transmitted in the embodiment described above from a bus master to a memory via multiple routers by the packet exchange method, data may also be transmitted by any other method. The router of this embodiment does not have to be used to transmit data from a bus master to a memory but may also be applied to any other system as long as the system is designed to transmit data between multiple nodes.

In the configuration shown in FIG. 4, the first and third groups of routers (R0 through R3 and R8 through R11), as well as the second group of routers (R4 through R7), are each illustrated as a single functional block. Actually, however, any other functional section such as an NIC (network interface controller) may be connected between each router belonging to the first group and a bus master and between each router belonging to the third group and a memory.

FIG. 5 is a block diagram illustrating a part of a data transmission system according to this embodiment. In FIG. 5, only a bus master 101, a router 600a in the first group, a router 600b in the second group, a router 600c in the third group, and a memory 105, which are connected as a set to a single transmission route, are illustrated for the sake of simplicity.

As shown in portion (a) of FIG. 5, an NIC 620a is connected between the bus master 101 and the router 600a in the first group. The NIC 620a has the function of performing bus protocol conversion processing and the function of choosing a memory 105 that can afford to have the memory size required by the bus master 101 from multiple memories and notifying the bus master 101 of the memory 105 chosen.

On the other hand, between the router 600c in the third group and the memory 105, connected are another NIC 620c and a memory controller 630. The NIC 620c performs bus protocol conversion processing, defines the correlation between the go-to route and the return-from route in a data transmission, and sends a response from the return-from route to the go-to route to the NIC 620a. In this description, the "go-to route" refers herein to a transmission route leading from the bus master 101 to the memory 105, and the "return-from" route refers herein to a transmission route leading from the memory 105 to the bus master 101. The memory controller 630 is connected to the NIC 620a and controls the order of having access to the memory 105.

In this description, illustration of the NICs 620a and 620c and the memory controller 630 is omitted for the sake of simplicity as shown in portion (b) of FIG. 5. That is to say, in the following description, every router illustrated as being directly connected to a transmission node such as the bus master 101 actually includes an NIC. In the same way, every router illustrated as being directly connected to a reception node such as the memory 105 actually includes an NIC and a memory controller.

Even though only transmission routes are illustrated in FIG. 5 for the sake of simplicity, a different kind of lines called "resetting common lines" are actually provided. Such "resetting common lines" will be described in detail later with reference to FIG. 7.

<2. Packet and Flit Formats>

Hereinafter, the structures of packets and flits according to this embodiment will be described. It should be noted that although packets or flits are supposed to be used in this embodiment, to transmit data in the packet form is just a matter of design. Thus, the same statement also applies even if those packets or flits are generalized and simply called "data".

FIG. 6 illustrates an exemplary transmission format for a packet 500 and how the packet 500 may be divided into a plurality of flits. The packet 500 includes a header field 501, a data field 502, and a control code field 503.

In the header field 501, described are flag information indicating that this is the head of a packet, the destination address, the source address, information indicating the priority of the packet, and information indicating the amount of time that has passed since the packet was transmitted (which will be referred to herein as "passed time information"). The passed time information may be described in any form as long as the value tells how much time has passed since the packet was transmitted. For example, a time when the packet was transmitted, the amount of time that has passed since the packet was transmitted, or the number of routers that the packet has passed through (i.e., the number of hops) may be described. For example, every time each router relays a given packet 500, the router may either increment the number of hops by one or decrement a predetermined maximum number of hops one by one sequentially. Any other kind of information may be described in the header field 501. Among those kinds of data in the header field 501, the destination address and the source address are used to perform the processing of relaying the packet 500 and the processing of receiving the packet 500 at the receiving end.

In the data field 502, described are video data and audio data, for example. In the control code field 503, a predetermined end code may be described, for example. The end of the packet 500 can be detected with the end code. In the control code field 503, any kinds of information other than the end code may also be stored.

As described above, the bus master 101 transmits the packet 500 after having broken down the packet 500 into smaller packet units called "flits". The size of one flit is determined by the width of the bus so that one flit can be transmitted in one cycle through the bus. The packet 500 is divided into a header flit 504, a plurality of data flits 505 and a tail flit 506. In the header flit 504, flag information and destination address information that are stored in the header field 501 may be included. In the present disclosure, a data stream including flits will be referred to herein as a "packet" unless stated otherwise.

In the flits that follow the header flit 504 (namely, the data flits 505 and the tail flit 506), no address information that specifies the destination is stored. The reason is that those flits following the header flit 504 are sent to the same destination as the header flit's 504. When the destination is determined by the header flit 504 and when it is determined what output buffer 606 will output the flit of that traffic flow, the flits that follow it will be transmitted to the destination specified by the header flit 504 using the same output buffer 606 as the header flit's 504.

To the tail flit 506, attached is flag information indicating that this is the last one of the flits that form that packet (i.e., an end code stored in the control code field 503). The data flits 505 other than the header flit 504 and the tail flit 506 are flits that are used mainly to transmit data and correspond to the data field 502 of the packet 500.

On detecting the flag information (i.e., the end code) that is described in the tail flit 506, the memory 105 on the receiving end restores those flits transmitted into the original packet based on that end code.

For example, one packet may have a size of 128 bytes and one flit may have a size of 32 or 64 bits. It should be noted, however, that the one packet and one flit sizes could vary according to the intended application and these are nothing but examples. Optionally, the length of one flit may be basically defined to be long enough to describe control data such as the destination address and the source address.

Each of the routers includes a buffer that accumulates the incoming flits. Those flits are once accumulated in the buffer and then transmitted, by performing normal processing (without bypassing), to either a router leading to the destination memory or directly to the destination memory itself by turning the switch.

<3. Router's Configuration and Operation>

<3.1. General Configuration for Router>

Next, a specific configuration for the router will be described. FIG. 7 illustrates a general configuration for a router according to this embodiment. In the following description, the router 600b in the second group will be taken as an example. As for routers in the first and third groups, however, their destinations and sources are different but their basic configuration is the same. In the following description, a router 600a in the first group will be sometimes referred to herein as a "router on the previous stage" and a router 600c in the third group will be sometimes referred to herein as a "router on the next stage". Also, routers in the first and third groups will be sometimes referred to herein as "adjacent routers". The router 600b determines the destination of a packet to be transmitted from the router 600a on the previous stage to the router 600c on the next stage and relays the traffic.

The router 600b includes a plurality of input ports 615 and a plurality of output ports 613. The router 600b receives flits from the router 600a on the previous stage through the input ports 615 and sends the flits to the router 600c on the next stage through the output ports 613.

The router 600b further includes buffer choosing sections 603 and a buffer state notifying section 612.

The buffer choosing sections 603 receive the flits from the router 600a on the previous stage and determine whether or not to bypass the flits.

The buffer state notifying section 612 (which will be sometimes simply referred to herein as a "notifying section 612") notifies another router of the availability of its own router's input buffers 604. Also, at the time of congestion, the notifying section 612 puts packets in the standby state (i.e., puts the packets on hold) for a packet transmission standby period following a predefined rule. In this description, the "time of congestion" refers herein to a situation where packets cannot be transferred. If the router 600b gets ready to transmit the packets that are put in the standby state, those packets are transmitted. On the other hand, unless the router 600b gets ready to transmit the packets even after the packets have been put on hold for the packet transmission standby period and if the amount of time for which the packets have been put on hold exceeds the packet transmission standby period, then the notifying section 612 performs packet discarding processing as will be described in detail later.

Optionally, the notifying section 612 may determine whether or not there is any obstruction on the packet transmission route by sending a packet transfer permission request to another router and by seeing if that another router approves the transmission. Hereinafter, this point will be described in detail. The packet transfer permission request may be sent to another router as an inquiry about the availability of the input buffers 604 at that router.

FIG. 8 illustrates a data transmission system in which there are obstruction and congestion. Specifically, obstruction has been caused on the communications route leading from a bus master 101a to a memory 105, while the communications route leading from a bus master 101b to the memory 105 is congested.

When going to transmit data packets to the memory 105, the bus master 101c sets the communications route on the left hand side of FIG. 8 to be the main route and the communications route on the right hand side of FIG. 8 to be the bypass route, respectively. Before starting to transmit the packets, the bus master 101c sends a packet transfer permission request to another router on any of these routes. If the transfer permission request is approved, the bus master 101c may start transferring the packets.

Suppose at a certain point in time the transfer permission request is approved by neither the router on the main route nor the router on the bypass route. That is to say, suppose a situation where the communications are disabled on both of the main and bypass routes has arisen. Such a communication disabled state could arise if the congestion got too heavy.

In that case, the notifying section 612 will put the packets on hold for the packet transmission standby period that has been determined by the method shown in FIG. 12, for example. While putting the packets on hold, however, the notifying section 612 sends packet transfer permission requests to other routers on these two routes at regular intervals.

If no permissions are gotten even after the packets are put on hold for the packet transmission standby period, then the notifying section 612 decides that communications cannot be made through the transmission route including the router as the target of inquiry and that the target transmission route is abnormal. In this description, the "abnormal" state refers herein to obstruction that has been caused by some failure in hardware or software. On deciding that the transmission route is abnormal, the notifying section 612 notifies at least one of the transmission node, the reception node and another router on the transmission route of the abnormality in the transmission route. This notification functions as an instruction to discard the packets. Optionally, the notifying section 612 may also output an instruction to discard the packets separately from that notification. Still alternatively, a "reset signal" to be described later may be output as a notification indicating that the transmission route is abnormal.

On the other hand, if permission has been gotten within the packet transmission standby period, then the notifying section 612 transmits data through that transmission route. Even if the bypass route is temporarily unavailable due to congestion as in the example shown in FIG. 8, the congestion may be cleared up and communications route may become available again before the packet transmission standby period passes. In that case, the notifying section 612 transmits the packets using the bypass route.

It should be noted that the communication breakdown on the main route could be caused simply by congestion, not obstruction. In that case, transfer permission could be gotten from both of the routers on the main and bypass routes within the packet transmission standby period. In that case, the notifying section 612 will transmit the packets through one of the two routes from which the permission has been gotten earlier than the other.

By performing these processing steps, the notifying section 612 can tell abnormality in the transmission route from congestion on the transmission route.

Also, if a resetting common line 610 is provided for the NoC and if the notifying section 612 is connected to the resetting common line 610, the notifying section 612 can send and receive a reset signal to/from the resetting common line 610. After having performed the packet discarding processing, the notifying section 612 outputs a reset signal to the resetting common line 610. On the other hand, on receiving a reset signal from another router that has performed the packet discarding processing, the notifying section 612 instructs at least one of the input and output buffers 604 and 606 to discard the packets that are currently held in its own router. The instruction may be output to the buffer that stores the data. If the packets are stored in both of the input and output buffers 604 and 606, then the instruction is output to both of the input and output buffers 604 and 606. As a result, when another router carries out the packet discarding processing, this router also discards the packets.

The router 600b further includes a crossbar switch 605 which changes connections on input and output ends and output buffers 606 which temporarily store the data that has been supplied from the crossbar switch 605. The router 600b further includes a routing processing section 607 which performs the processing of transferring packets to their destination, a buffer allocator 608 and a switch allocator 609. In this embodiment, the buffer choosing section 603 determines whether or not a bypass route needs to be selected so as to transmit the packets within a limited time and then sends the packets to the input buffer 604, which is associated with either the main route or the bypass route.

In the example illustrated in FIG. 7, the router 600b includes two buffer choosing sections 603, four input buffers 604 and two output buffers 606. However, this is only an example of the present disclosure. Rather the numbers of these buffers are appropriately determined according to the size of the traffic flow to transmit.

The buffer choosing section 603 determines, by reference to the information described in the header flit, whether or not the flits received may be forwarded to the bypass route. If the decision has been made that the flits may not be forwarded to the bypass route, then the buffer choosing section 603 stores the traffic flow, including those flits, in the input buffer 604 on the main route. On the other hand, if the decision has been made that the flits may be forwarded to the bypass route, then the buffer choosing section 603 sends the traffic flow to the bypass route. It will be described in further detail later exactly how to make the decision on bypassing.

By reference to the destination information described in the flits, the routing processing section 607 determines which output port the flits need to be transferred to. As the routing algorithm, dimensional order routing that determines the destination dynamically or static routing that determines the destination uniquely by reference to the relation between the source and the destination during the design process may be used. The present disclosure is not limited to any particular routing algorithm.

Meanwhile, the buffer allocator 608 chooses an available one of the output buffers 606 connected to the output port 613 that has been chosen by the routing processing section 607, and associates the buffer queue of the input buffer 604 with the output buffer 606 (or the input buffer of the router at the destination).

Furthermore, the switch allocator 609 chooses one of the sets of input and output buffers that have already been associated with each other to transmit traffic data. The switch allocator 609 transfers the flits to the output buffer 606 via the crossbar switch 605. As a result, the flits are transferred from the output buffer 606 to the associated router 600c.

The input buffers 604 include a plurality of buffers (or buffer queues), so do the output buffers 606. Optionally, the buffers may be implemented as virtual channels. If the buffers are implemented as virtual channels, a plurality of virtual lines will be formed. In general, a "virtual line" refers to a communications line which is a single communications line physically but regarded as a plurality of communications lines logically.

Even though the router 600b of this embodiment includes the output buffers 606, the output buffers 606 may be sometimes omitted to cut down the memory space consumed as much as possible to cope with the load in the expected application. That is to say, the router may also be configured to use the output buffers 606 and the input buffers of the router 600c at the destination in common. The effects of this embodiment can also be achieved even if the output buffers 606 are replaced with the input buffers of the router at the destination.

<3.2. Outline of Router's Operation>

FIG. 9 is a flowchart showing how the router 600b operates. First of all, in Step S801, the buffer choosing section 603 of the router 600b receives flits from the adjacent router 600a. Next, in Step S802, the buffer choosing section 603 determines whether or not a bypass can be made.

If the decision has been made that the flits received belong to a flow that can be bypassed, the buffer choosing section 603 sends those flits to both the input buffer 604 corresponding to the main route and the input buffer 604 corresponding to the bypass route. On the other hand, if the decision has been made that the bypass cannot be made, then the buffer choosing section 603 sends the flits to only the input buffer 604 corresponding to the main route.

Next, in Step S803, the routing processing section 607 analyzes the header flits and determines the output port 613. Subsequently, in Step S804, the buffer allocator 608 associates the output port with the buffer queue of the input buffer of the router at the destination. Then, in Step S805, the switch allocator 609 chooses ones of the sets of the output ports and the input buffers that have been associated with each other to transmit the traffic data. Thereafter, in Step S806, data is transmitted from the target buffer queue either on a flit-by-flit basis or on a packet-by-packet basis. Finally, in Step S807, if the decision has been made that the bypass can be made, the buffer choosing section 603 deletes the main route through which no data has been transmitted, the input buffers 604 on the bypass route, and the association of the output port with the buffer queue of the input buffer of the router at the destination.

FIG. 10 illustrates the procedure of processing to be carried out by a general router. The configuration and processing procedure of the general router are basically the same as the configuration shown in FIG. 7 and the processing procedure shown in FIG. 9 unless the bypass described above is made. First of all, (1) by analyzing the header flit, an output port is chosen by reference to the destination address (which is called "routing computation (RC)"). In this embodiment, this processing step is carried out by the routing processing section 607 and corresponds to the processing step S803.

Next, (2) the buffer queue of the input buffer of the adjacent router at the destination (or the buffer queue of the output buffer of its own router) is chosen (which is called "virtual channel allocation (VA)"). In this embodiment, this processing step is carried out by the buffer allocator 608 and corresponds to the processing step S804 shown in FIG. 9. As references for determining the order in which the output ports and buffer queues are associated with each other, round robin, the order of arrival of packets, and the order of deadlines may be used, for example.

Subsequently, (3) one of the sets of the output ports and input buffers that have already been associated with each other to transmit traffic data is chosen (which is called "switch allocation (SA)"). In this processing step, as references for choosing one of the sets of the output ports and input buffers that have already been associated with each other, round robin, the order of arrival of packets, and the order of deadlines may also be used, for example. It should be noted that even if one set has been chosen, the data is transmitted only if the decision has been made that the router at the destination is ready to accept the data. In this embodiment, this processing step is carried out by the switch allocator 609 and corresponds to the processing step S805 shown in FIG. 9.

And then (4) data is transmitted from the target buffer queue on a flit-by-flit basis (which is called "switch traversal (ST)"). In this embodiment, this processing step is carried out by the switch allocator 609 and corresponds to the processing step S806 shown in FIG. 9. The data does not have to be transmitted on a flit-by-flit basis but may also be transmitted on a packet-by-packet basis.

<Determining Packet Transmission Standby Period>

Portions (a) and (b) of FIG. 11 show what the packet transmission standby period is.

In the example illustrated in portion (a) of FIG. 11, traffic flows from the bypass route into the main route. In this example, as the router 600c on the main route is congested when the traffic is going to flow from the bypass route into the main route, the traffic flowing from the bypass route has its packets rejected. As a result, the previous router 600b located just before the point of confluence waits for the packets to be transmitted (which is called "packet transmission standby").

In this embodiment, the router 600b keeps transmission of packets from the bypass route waiting for a predetermined packet transmission standby period. If the wait has exceeded the predetermined packet transmission standby period, then the router 600b on the bypass route discards the packets as shown in portion (b) of FIG. 11 (which is called "packets discarded"). A more specific method of applying the present disclosure will be described later with reference to FIG. 14 and the drawings that follow it.

FIG. 12 shows correspondence between parameters that determine the packet transmission standby period and the method of determining the packet transmission standby period.

In this embodiment, as the parameters for determining the packet transmission standby period, the following three parameters (or indices) may be used, for example:
 (a) the number of hops (H) from the bus master in the router 600b in the transmission standby state (see FIG. 11);
 (b) the number of traffic flows (F) that share the same transmission line in common; and
 (c) evaluation formula (V)

If the number of hops (H) from the bus master in the router 600b in the transmission standby state (see FIG. 11) is used as an index for determining the packet transmission standby period, the smaller the number of hops from the bus master on the transmitting end, the shorter the standby period is set to be and the earlier the packets are discarded. That is to say, higher priority is given to discarding the packets rather than putting the packets on hold. The reason is that as the number of hops from the bus master is small, it would be more effective to recover the packets by re-sending the packets rather than putting them on hold. In view of this consideration, the packet discarding processing is supposed to be carried out positively. Conversely, if the number of hops is large, then the loss that would be caused by discarding the packets should be significant, and therefore, the standby period is extended.

Alternatively, according to another method for determining the packet transmission standby period, a time value to be defined according to the number of routers on the transmission route that leads from the transmission node to the reception node (e.g., from a bus master to a memory) may be used as the packet transmission standby period. For example, communications are supposed to be established via five routers from a master as the source to a memory as the destination. In that case, the relay processing needs to be carried out ten times in total since the packets are sent out from the master and until the packets return to the master. If each single router needs to carry out processing for three cycles, then 30 (=5× 3×2) cycles are given as the packet transmission standby period. Alternatively, a time value that is proportional to the number of routers may be determined to be the packet transmission standby period.

Optionally, the worst-case transmission delay to be calculated by adding a fixed inevitable delay (e.g., processing delay involved with packetizing or de-packetizing or processing delay caused by a memory controller) to the packet transmission standby period may be defined to be the packet transmission standby period. If no permission is gotten from the closest adjacent router even when the worst-case transmission time delay is exceeded, then the decision can be made that the transmission line in question is abnormal. The designer of the system can estimate these values while designing the bus. Also, the packet transmission standby period value may be determined on a use case basis. If the transmission route is different, an independent packet transmission standby period may be given to each use case. Furthermore, in determining the packet transmission standby period, the number of flows (F) that use the same transmission line in common may also be used. Besides, the packet transmission standby period value is not limited to any of these indices but may also be set to be any arbitrary value that the designer gets from his or her experience.

Specifically, if the number of hops is two or less, the packet transmission standby period may be set to be 100 cycles. On the other hand, if the number of hops is more than two, then the packet transmission standby period may be set to be 1000 cycles, for example.

If the number of traffic flows (F) that use the same transmission line in common is used as an index for determining the packet transmission standby period, the packet standby period is shortened and the packets are discarded earlier in a situation where the load on the routers is rapidly increasing when a system failure occurs, for example. By resetting the system's operation and starting the system all over again by discarding the packets, the system can be brought back to its normal state quickly.

Specifically, if the number of flows is greater than ten, then the number of traffic flows transmitted is regarded as exceeding the one that was expected during the design process and the packet transmission standby period is shortened (to 100 cycles, for example).

If the evaluation formula (V) is used as an index for determining the packet transmission standby period, then it means in this embodiment that the number of hops (H) to make from a bus master of the router in the transmission standby state and the number of flows (F) that use the same transmission line in common are both used. Specifically, the evaluation formula may be given as V=the number of hops to make from the bus master×the number of flows that use the same transmission line in common (i.e., V=H×F). However, this is only an example. Alternatively, the evaluation formula may be defined in advance to be one of multiplication, division, addition or subtraction with the implementability of the evaluation formula also taken into account. By taking both the number of hops (H) and the number of flows (F) that use the same transmission line in common into consideration, the cause of the abnormality in the system can be narrowed down more easily and it is possible to prevent the packets from being discarded too frequently.

FIG. 13 illustrates how other nodes are notified that packets have been discarded by the router 600b.

When packets are discarded, the router 600b notifies the bus master 101 at the source that the packets have been discarded. At this point in time, the router 600b notifies not only the bus master 101 at the source but also each of the routers (not shown) that have relayed the discarded packets that the packets have been discarded. In response to the notification, each of those routers discards the packets being transferred for the following reason. Specifically, a group of packets that form one traffic flow are being transmitted in a row through a bus as a series of packets. If any of those packets that form a traffic flow were discarded, then the essential data for the traffic flow would be lost and the target data could not be obtained anymore. In that case, the other packets of that traffic flow would be no longer useful. For that reason, the other routers are supposed to discard the packets that are being transferred now.

When the router 600b notifies the bus master 101 at the source that the packets have been discarded, the bus master 101 at the source can know that packets should be re-sent. Thus, the bus master 101 at the source will re-send the packets after that.

In the foregoing description, each router is supposed to discard packets in response to the notification that the packets have been discarded. However, this is just an exemplary operation of the router. In another example, the resetting common line 610 (see FIG. 7) described above may also be used. In that case, the router 600b that has discarded the packets outputs a reset signal to the resetting common line 610. On receiving the reset signal, the other routers automatically start performing the processing of discarding the packets that are retained at that point in time. In this example, the reset signal functions as not only a packet discard notification but also a signal that resets the operation of each of the other routers.

It should be noted that the router to perform the packet discard processing does not have to be located between the router 600b that has discarded the packets and the bus master 101. Alternatively, a router located between the router 600b that has discarded the packets and the memory 105 (e.g., the router 600c) may also perform the packet discard processing. The reason is that those routers also retain no longer useful packets. Furthermore, the packets (or data) that have arrived at the memory 105 earlier may also be discarded.

Also, the bus master 101 at the source notifies the application that has generated the traffic flow related to the discarded packets that the packets have been discarded. Then, the bus master 101 either restarts the application or discards the data that has already been transferred depending on the necessity.

<3.3 Configuration and Operation of Buffer Choosing Section>

FIG. 14 illustrates an exemplary application of this embodiment to parallel transmission using a bypass route. Specifically, portion (a) of FIG. 14 illustrates how a traffic flow is being transmitted through both a main route and a bypass route. Master A is transmitting a traffic flow to a GW (gateway) through the main route. On the other hand, Master C is transmitting a traffic flow to the GW through the bypass route (which is the main route for Master C). Portion (b) of FIG. 14 illustrates an example in which Master A has detected available routers on the bypass route and is transmitting the traffic flow at the same time through both the main route and the bypass route. As a result, compared to the situation where only the main route is used, Master A can achieve higher transmission efficiency.

FIG. 15 illustrates generally how to perform bypass processing according to this embodiment.

In this embodiment, a router determines whether or not a packet should be transmitted through a bypass route. Specifically, a router which is located just before the point of confluence to a bypass route (which will be referred to herein as a "last router 1201 before the bypass route) determines, based on the transmission status of a router which is located right after the point of confluence to the bypass route (which will be referred to herein as a "first router 1202 on the bypass route") and the quality required for the traffic flow to go through the bypass route, whether or not the packet should go through the bypass route. As a result, the transmission efficiency can be increased on both of the main route and the bypass route with the permissible delay of the traffic flow also taken into consideration.

FIG. 16 shows the procedure of operation of the first router 1202 on the bypass route.

The notifying section 612 of the router 1202 transmits acceptance information to the last router 1201 before the bypass route at predetermined notification intervals T1 depending on the state of its own input buffer. Specifically, the notifying section 612 transmits, as the acceptance information, information indicating that "a traffic flow with a high degree of priority can be transferred", "only a traffic flow with a low degree of priority can be transferred" or "no packets can be accepted at all" (in Step S1301).

It may be determined in the following manner what acceptance information should be transmitted. Specifically, if the input buffer of the first router 1202 on the bypass route has not transmitted any traffic flow with a high degree of priority for a predetermined period of time, then a notification that says "a traffic flow with a high degree of priority can be transferred" is sent. On the other hand, if the total quantity of traffic flows with high degrees of priority and traffic flows with low degrees of priority is equal to or smaller than a predetermined quantity of traffic flows, then a notification that says "only a traffic flow with a low degree of priority can be transferred" is sent. Furthermore, if the total quantity of traffic flows is greater than the predetermined quantity of traffic flows, a notification that says "no packets can be accepted at all" is sent.

Next, the decision is made whether or not a transfer permission request has been received from the last router 1201 before the bypass route (in Step S1302). If no transfer permission request has been received yet (i.e., if the answer to the query of the processing step S1302 is NO), the process goes back to the processing step S1301.

On the other hand, if a transfer permission request has been received from the last router 1201 before the bypass route (i.e., if the answer to the query of the processing step S1302 is YES), then the notifying section 612 of the first router 1202 on the bypass route responds as to whether packets received from the last router 1201 before the bypass route are acceptable or not depending on the state of its own input buffer (in Step S1303).

Specifically, if a permission request for transferring a traffic flow with a high degree of priority has been received from the last router 1201 before the bypass route and if its own router can accept the traffic flow with a high degree of priority, then the last router 1201 before the bypass route is notified that the traffic flow is acceptable in the same way as in determining the acceptance information described above. It should be noted that the intervals T1 at which the acceptance information is sent to the router on the transmitting end may be fixed value.

FIG. 17 shows a procedure of operation of the last router 1201 before the bypass route.

The buffer choosing section 603 of the router 1201 chooses packets to transmit in accordance with the acceptance information received from the first router 1202 on the bypass route (in Step S1401). At this point in time, the router 1201 copies the same packets for the associated input buffers 604 on the main route and the bypass route. As a result, the packets can be transferred to the main and bypass routes. In this description, such processing of copying the same packets will be referred to herein as "transfer setting".

According to the method of determining the packet transmission standby period shown in FIG. 12, it can be said that in the example shown in FIG. 15, the router 1201 is located at a relatively short distance (i.e., at a relatively small number of hops away) from the bus master on the transmitting end. Thus, it would be effective to recover the packets by discarding and re-sending the packets preferentially. That is why the router 1201 decides whether the packets should be sent to the main route or the bypass route. As it takes just a short time for the router 1201 to make this decision, the processing delay problem is substantially avoidable. Since the destination of the packets changes depending on the result of the decision, the same packets are copied in advance to the input buffers 604 so that the packets can be transmitted through any of the main route and the bypass route.

Specifically, to make the transfer setting, the processing steps S803, S804 and S805 shown in FIG. 9 are performed at respective sections of the router. For example, by the method that has already been described with reference to FIG. 12, the standby period T2 is set, and the notifying section 612 of the router sends not only information about the degree of priority of the traffic flow that is going to be sent but also a transfer permission request to the first router 1202 on the bypass route (in Steps S1402 and S1403). Furthermore, permission is waited to come from the first router on the bypass route for the period of time T2 at maximum. If the transfer onto the bypass route is permitted (in Step S1404), the notifying section 612 instructs that the packets be sent to the input buffer 604, thereby transmitting the packets through the bypass route (in Step S1405), which corresponds to the processing step S806 shown in FIG. 9.

Next, the packets headed to the input buffer through the main route are discarded and the setting processing to transfer packets through the main route, including associating the respective buffer queues of the output port and the input buffer of the router at the destination, is canceled. This processing step corresponds to the processing step S807 in FIG. 9.

If no transfer permission is gotten or if the standby period T2 is exceeded, then data is transferred onto the main route (in Step S1406). Specifically, as transfer setting, the processing steps S803, S804 and S805 shown in FIG. 9 are performed at respective sections of the router. Also, the packets headed to the input buffer 604 through the bypass route are discarded and the setting processing to transfer packets through the bypass route, including associating the respective buffer queues of the output port and the input buffer of the router at the destination, is canceled (in Step S1407).

<4. Other Topologies>

In the foregoing description, the topology of the integrated circuit is supposed to be the multistage interconnection network (see FIG. 4). However, the router 600 of this embodiment does not have to be used in such a multistage interconnection network. Alternatively, a mesh-type topology may also be formed by arranging multiple routers as a grid as shown in Portion (a) of FIG. 18. Still alternatively, a torus-type topology may also be adopted as shown in Portion (b) of FIG. 18. Furthermore, a hierarchical topology, in which buses are connected together hierarchically, may even be adopted as shown in Portion (c) of FIG. 18. Anyway, the router of this embodiment is applicable in the same way to any topology in which a number of bus masters are connected together through distributed buses.

For example, in Portions (a) and (b) of FIG. 18, multiple transmission routes can be secured from a bus master to a memory. That is to say, any one of those transmission routes may be set to be the main route and another one of them the bypass route, respectively. By making the notifying section 612 perform the processing described above on those transmission routes, abnormality in a transmission route and mere congestion on the transmission route can be distinguished from each other. It should be noted that the main and bypass routes do not have to be fixed. Alternatively, each bus master may use a different set of main and bypass routes or the sets of main and bypass routes to use may be changed according to the relation between a bus master and a memory to which data is going to be transmitted.

<5. Exemplary Applications>

<5.1. Bus Masters and Memories on Semiconductor Circuit>

Hereinafter, exemplary applications of the router of the embodiment described above to actual devices will be described.

FIG. 19 illustrates an example in which multiple bus masters and multiple memories on a semiconductor circuit are connected together with distributed buses. Such a semiconductor circuit may be used in portable electronic devices such as cellphones, PDAs (personal digital assistants) and electronic book readers, TVs, video recorders, camcorders and surveillance cameras, for example. The bus masters may be CPUs, DSPs, transmission processing sections and image processing sections, for example.

When multiple applications or services are used in parallel with each other (e.g., when multiple different video clips or musical tunes are reproduced, recorded or transcoded, or when book, photograph or map data is viewed or edited, or when a game is played), respective bus masters will access memories more frequently. If there was only one memory to be accessed by the respective bus masters, then those accesses would be overconcentrated at one point. To reduce such an overconcentration of accesses, however, the input and output transmission ranges should be broadened on the memory side, which would increase the cost.

To avoid such overconcentrated memory accesses, it is effective to connect those bus masters and memories together with distributed buses by physically classifying the memories to be used by bus masters according to the type of the application or the service.

However, if a bus master has transmitted a data packet to Memory A at a high rate in order to save video data there, then every buffer on the transmission route will be occupied with the packet to be sent to the memory A frequently. In that case, data will not flow to the other memories smoothly and the performances of the other applications or services will decline and the processing time will increase. Such a problem arises when each router simply relays data packets one after another in the order of reception.

If the router of the present disclosure is used, however, packets of urgency or importance will be transmitted preferentially. As a result, the router can prevent packets headed to a particular memory from occupying the buffers, and therefore, important data for applications or services can be transmitted by the deadline. Consequently, the applications or services can maintain quick enough response to the users and reasonably high video and audio qualities. Furthermore, if the present disclosure is applied to bypass transmission, the decision may be made, with acceptance information also taken into account, whether or not a bypass route needs to be adopted. Then, even with respect to data with low priorities, traffic flow interference with data with high priorities can be minimized. As a result, the transmission efficiency of the overall system improves and some power saving can be expected, too. Particularly when a data propagation delay caused is longer than what was expected during the design process, important data can be transmitted preferentially and urgently. That is why this will provide an effective countermeasure to even a situation where an unexpectedly excessive load has been imposed on the system.

<5.2. Multi-Core Processor>

Next, an exemplary application of the router of the embodiment described above to a multi-core processor will be described.

FIG. 20 illustrates a multi-core processor in which a number of core processors such as a CPU, a GPU and a DSP are arranged in a mesh pattern and connected together with distributed buses in order to improve the processing performance of these core processors. In this configuration, each of these core processors may function as either a first node or a second node according to the present disclosure.

On this multi-core processor, communications are carried out between the respective core processors. For example, each core processor has a cache memory to store necessary data to get arithmetic processing done. And information stored in the respective cache memories can be exchanged and shared with each other between those core processors. As a result, their processing performance can be improved.

However, the communications are carried out between those core processors on such a multi-core processor at respectively different locations, over mutually different distances (which are represented by the number of routers to hop), and with varying frequencies of communication. That is why if data packets transmitted are just relayed with their order of reception maintained, then some routers will have all of their buffers occupied with packets to be sent to particular core processors and will not let the data flow smoothly. As a result, the performance of the multi-core processor will decline and its processing time will increase.

If the router of the embodiment described above is used, however, packets of urgency or importance will be transmitted preferentially. As a result, the router can prevent packets headed to a particular memory from occupying the buffers, and therefore, important data can be transmitted by the deadline. Consequently, the applications or services can maintain quick enough response to the users and reasonably high video and audio qualities. Furthermore, if the present disclosure is applied to bypass transmission, the decision may be made, with acceptance information also taken into account, whether or not a bypass route needs to be adopted. Then, even with respect to data with low priorities, traffic flow interference can be minimized. As a result, the transmission efficiency of the overall system improves and some power saving can be expected, too. Particularly when a data propagation delay caused is longer than what was expected during the design process, important data can be transmitted preferentially and urgently. That is why this will provide an effective countermeasure to even a situation where an unexpectedly excessive load has been imposed on the system.

<5.3. Simulation Program>

In the embodiments and exemplary applications described above, configurations in which the present disclosure is implemented on a chip have been described. However, the present disclosure can be carried out not just as such on-chip implementation but also as a simulation program for performing design and verification processes before that on-chip implementation process. And such a simulation program is executed by a computer. In this exemplary application, the respective elements shown in FIG. 7, for example, are implemented as a class of objects on the simulation program. By loading a predefined simulation scenario, each class gets the operations of the respective elements performed by the computer. In other words, the operations of the respective elements are carried out either in series or in parallel to/with each other as respective processing steps by the computer.

A class that is implemented as routers gets such a simulation scenario, which has been defined by a simulator, loaded, thereby setting conditions on the threshold value of priorities and so on and also setting conditions on the timings to transmit packets that have been received from a class of other routers, their destinations, their order of priorities, their deadlines and so on.

On the other hand, a class that is implemented as routers with bypass routes receives data from a class of other routers in each simulation scenario and selectively performs either bypass processing or normal processing depending on whether the data should be bypassed or not.

A class that is implemented as routers performs its operation until the condition to end the simulation, which is described in the simulation scenario, is satisfied, thereby calculating the throughput and latency during the operation, a variation in flow rate on the bus, and estimated operating frequency and power dissipation and providing them for the user of the program. And based on these data provided, the user of the program evaluates the topology and performance and performs design and verification processes.

For example, various kinds of information such as the ID of the source node, the ID of the destination node, the size of a packet to transmit, and the timing to transmit the packet are usually described on each row of the simulation scenario. Optionally, by evaluating a plurality of simulation scenarios in a batch, it can be determined efficiently whether or not the intended performance is ensured by every possible scenario imagined. Furthermore, by comparing the performance with the topology or the number of nodes of the bus and/or the arrangement of the transmission nodes, the routers and the destination nodes changed, it can be determined what network architecture is best suited to the simulation scenario. In that case, the configuration of any of the embodiments described above can be used as design and verification tools for this embodiment. That is to say, the present disclosure can also be carried out as such design and verification tools.

A router according to an embodiment of the present disclosure can be used to transmit data on a data transmission system such as a system LSI.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A router which is provided for an integrated circuit that has distributed buses and which is arranged on a transmission route that leads from a transmission node to a reception node on the distributed buses in order to relay data, the distributed buses including first and second routes, each leading from the router to the reception node, the router comprising:
an input buffer having a plurality of data storage sections to store data;
an output section configured to output the data that is stored in the input buffer and configured to have a plurality of output ports;
a routing processing section configured to analyze the data to choose, for each of the first and second routes, one of the output ports through which the data is going to be output;
a buffer allocator configured to associate, for each of the first and second routes, a particular one of the data storage sections that store the data with one of the data storage sections of the input buffer of a next-stage router which is connected to the output port that has been chosen by the routing processing section;
a switch allocator configured to arrange a schedule to transfer the data in accordance with the association that has been made by the buffer allocator; and
a notifying section configured to send a data transfer permission request to a second router on the first route and a third router on the second route and configured to determine whether or not the request is approved before a predetermined standby period passes to see if there is any abnormality in the first and second routes,
wherein if the request is approved before the predetermined standby period passes, the notifying section gets the data transmitted through an output port that is connected to one of the first and second routes that has approved the request.

2. The router of claim 1, wherein unless the request is approved before the predetermined standby period passes, the notifying section instructs at least one of the input buffer and the output section to discard the data.

3. The router of claim 2, wherein the distributed buses further have a resetting common line, to which the second router on the first route and/or the third router on the second route is/are connected, and
wherein unless the request is approved before the predetermined standby period passes, the notifying section notifies at least one of the second router on the first route, the third router on the second route, the transmission node and the reception node of abnormality through the resetting common line.

4. The router of claim 3, wherein the router is arranged on a transmission route leading from a bus master as the transmission node to a memory as the reception node and relays the data.

5. The router of claim 2, wherein the distributed buses further have a resetting common line, and
wherein on being notified of abnormality in the transmission route through the resetting common line, the notifying section discards the data that is stored in the input buffer.

6. The router of claim 5, wherein the router is arranged on a transmission route leading from a bus master as the transmission node to a memory as the reception node and relays the data.

7. The router of claim 2, wherein the router is arranged on a transmission route leading from a bus master as the transmission node to a memory as the reception node and relays the data.

8. The router of claim 1, wherein if both the second router on the first route and the third router on the second route approve the request before the predetermined standby period passes, the notifying section gets the data transmitted through an output port that is connected to one of the first and second routes that has approved the request earlier than the other.

9. The router of claim 8, wherein the router is arranged on a transmission route leading from a bus master as the transmission node to a memory as the reception node and relays the data.

10. The router of claim 1, wherein the distributed buses further have a resetting common line, to which the second router on the first route and/or the third router on the second route is/are connected, and
wherein unless the request is approved before the predetermined standby period passes, the notifying section notifies at least one of the second router on the first route, the third router on the second route, the transmission node and the reception node of abnormality through the resetting common line.

11. The router of claim 10, wherein the router is arranged on a transmission route leading from a bus master as the transmission node to a memory as the reception node and relays the data.

12. The router of claim 1, wherein the notifying section defines the predetermined standby period to be the period of time that is determined by the number of routers that are present on the transmission route leading from the transmission node to the reception node.

13. The router of claim 12, wherein the router is arranged on a transmission route leading from a bus master as the transmission node to a memory as the reception node and relays the data.

14. The router of claim 1, wherein the router is arranged on a transmission route leading from a bus master as the transmission node to a memory as the reception node and relays the data.

15. The router of claim 1, wherein the router is arranged on a transmission route leading from a bus master as the transmission node to a memory as the reception node and relays the data.

16. A router which is provided for an integrated circuit that has distributed buses and which is arranged on a transmission route that leads from a transmission node to a reception node on the distributed buses in order to relay data, the distributed buses including first and second routes, each leading from the router to the reception node,
the router comprising:
an input buffer having a plurality of data storage sections to store data;
an output section configured to output the data that is stored in the input buffer and configured to have a plurality of output ports;
a routing processing section configured to analyze the data to choose, for each of the first and second routes, one of the output ports through which the data is going to be output;
a buffer allocator configured to associate, for each of the first and second routes, a particular one of the data storage sections that store the data with one of the data storage sections of the input buffer of a next-stage router which is connected to the output port that has been chosen by the routing processing section;
a switch allocator configured to arrange a schedule to transfer the data in accordance with the association that has been made by the buffer allocator; and
a notifying section configured to send a data transfer permission request to a second router on the first route and a third router on the second route and configured to determine whether or not the request is approved before a predetermined standby period passes to see if there is any abnormality in the first and second routes,
wherein the distributed buses further have a resetting common line, and
wherein on being notified of abnormality in the transmission route through the resetting common line, the notifying section discards the data that is stored in the input buffer.

17. The router of claim 16, wherein the router is arranged on a transmission route leading from a bus master as the transmission node to a memory as the reception node and relays the data.

18. A method for controlling a router which is provided for an integrated circuit that has distributed buses and which is arranged on a transmission route that leads from a transmission node to a reception node on the distributed buses in order to relay data, the distributed buses including first and second routes, each leading from the router to the reception node, the router comprising:
an input buffer having a plurality of data storage sections to store data;
an output section which outputs the data that is stored in the input buffer and which has a plurality of output ports;
a routing processing section which analyzes the data to choose, for each of the first and second routes, one of the output ports through which the data is going to be output;
a buffer allocator which associates, for each of the first and second routes, a particular one of the data storage sections that store the data with one of the data storage sections of the input buffer of a next-stage router which is connected to the output port that has been chosen by the routing processing section; and
a switch allocator which arranges a schedule to transfer the data in accordance with the association that has been made by the buffer allocator,
wherein the method comprises the steps of:
sending a data transfer permission request to a second router on the first route and a third router on the second route; and
determining whether or not the request is approved before a predetermined standby period passes to see if there is any abnormality in the first and second routes,
wherein if the request is approved before the predetermined standby period passes, getting the data transmitted through an output port that is connected to one of the first and second routes that has approved the request.

19. A non-transitory computer-readable storage medium having a computer program stored thereon designed to carry out a simulation on a router which is provided on a transmission route leading from a transmission node to a reception node on distributed buses in order to relay data, the distributed buses including first and second routes, each leading from the router to the reception node, the router including:
- an input buffer having a plurality of data storage sections to store data;
- an output section which outputs the data that is stored in the input buffer and which has a plurality of output ports;
- a routing processing section which analyzes the data to choose, for each of the first and second routes, one of the output ports through which the data is going to be output;
- a buffer allocator which associates, for each of the first and second routes, a particular one of the data storage sections that store the data with one of the data storage sections of the input buffer of a next-stage router which is connected to the output port that has been chosen by the routing processing section; and
- a switch allocator which arranges a schedule to transfer the data in accordance with the association that has been made by the buffer allocator,
- wherein the computer program makes a computer perform the method steps of claim 18.

\* \* \* \* \*